United States Patent
Sung et al.

(10) Patent No.: US 10,516,449 B2
(45) Date of Patent: Dec. 24, 2019

(54) MULTI-USER MIMO-OFDM SYSTEM

(71) Applicant: Commonwealth Scientific and Industrial Research Organisation, Acton, Australian Capital Territory (AU)

(72) Inventors: Chang Kyung Sung, Thornleigh (AU); Rodney Kendall, Cherrybrook (AU); David Eric Humphrey, Carlingford (AU); Hajime Suzuki, Chatswood (AU)

(73) Assignee: Commonwealth Scientific and Industrial Research Organisation, Act (AU)

( * ) Notice: Subject to any disclaimer, the term of this patent is extended or adjusted under 35 U.S.C. 154(b) by 0 days.

(21) Appl. No.: 15/870,367

(22) Filed: Jan. 12, 2018

(65) Prior Publication Data
US 2018/0205425 A1    Jul. 19, 2018

Related U.S. Application Data

(63) Continuation-in-part of application No. PCT/AU2017/050001, filed on Jan. 3, 2017, and a
(Continued)

(30) Foreign Application Priority Data

Jul. 14, 2015 (AU) ................. 2015902780
Jul. 14, 2015 (AU) ................. 2015902781
Jul. 14, 2015 (AU) ................. 2015902782

(51) Int. Cl.
*H04B 7/0452* (2017.01)
*H04L 25/02* (2006.01)
(Continued)

(52) U.S. Cl.
CPC ......... *H04B 7/0452* (2013.01); *H04B 7/0626* (2013.01); *H04L 25/022* (2013.01);
(Continued)

(58) Field of Classification Search
CPC .. H04B 7/0417; H04B 7/0452; H04B 7/0626; H04L 25/0232; H04L 25/0258; H04L 5/0007; H04L 5/0023; H04L 5/0048
See application file for complete search history.

(56) References Cited

U.S. PATENT DOCUMENTS 8,020,075 B2    9/2011    Kotecha
8,938,015 B2    1/2015    Arambepola et al.
(Continued)

FOREIGN PATENT DOCUMENTS

EP    2259517 A2    8/2010
WO    2014/171551    10/2014
(Continued)

OTHER PUBLICATIONS

International Preliminary Report on Patentability for International Application No. PCT/AU2016/050619 dated Jan. 19, 2018 (10 pages).
(Continued)

*Primary Examiner* — Kashif Siddiqui
(74) *Attorney, Agent, or Firm* — Merchant & Gould P.C.

(57) ABSTRACT

The present invention discloses various improvements to multi-user multiple-input multiple-output orthogonal frequency division multiplexing (MU-MIMO-OFDM) wireless communication systems. In one aspect there is disclosed an efficient and accurate channel estimation method and system using locally consecutive pilot sub-carriers. In another aspect there is disclosed an efficient channel feedback method and system by applying a discrete cosine transform to channel coefficients. In another aspect there is disclosed
(Continued)

an efficient method and system to calculate a part of the channel inverse by interpolation. These aspects can be used in combination to improve the MU-MIMO-OFDM system.

22 Claims, 19 Drawing Sheets

Related U.S. Application Data continuation-in-part of application No. PCT/AU2016/050619, filed on Jul. 14, 2016.

(51) Int. Cl.
*H04B 7/06* (2006.01)
*H04B 7/0417* (2017.01)
*H04L 5/00* (2006.01)

(52) U.S. Cl.
CPC ...... *H04L 25/0232* (2013.01); *H04L 25/0258* (2013.01); *H04B 7/0417* (2013.01); *H04L 5/0007* (2013.01); *H04L 5/0023* (2013.01); *H04L 5/0048* (2013.01)

(56) References Cited

U.S. PATENT DOCUMENTS

| | | | |
|---|---|---|---|
| 2004/0085939 A1 | 5/2004 | Wallace et al. | |
| 2005/0249181 A1* | 11/2005 | Vijayan | H04L 5/0048 370/344 |
| 2007/0243837 A1* | 10/2007 | Krishnamoorthi | H04L 1/206 455/115.1 |
| 2008/0056305 A1* | 3/2008 | Medvedev | H04L 1/0045 370/491 |
| 2009/0016425 A1 | 1/2009 | Hui et al. | |
| 2009/0274220 A1 | 11/2009 | Yun et al. | |
| 2010/0014600 A1* | 1/2010 | Li | H04L 25/0212 375/260 |
| 2011/0003607 A1 | 1/2011 | Forenza et al. | |
| 2012/0062421 A1 | 3/2012 | Su et al. | |
| 2012/0300864 A1 | 11/2012 | Merlin et al. | |
| 2013/0177092 A1 | 7/2013 | Cariou et al. | |
| 2013/0329645 A1 | 12/2013 | Golitschek Edler Von Elbwart | |
| 2014/0219324 A1* | 8/2014 | Arambepola | H04L 27/01 375/226 |

FOREIGN PATENT DOCUMENTS

| | | |
|---|---|---|
| WO | 2016/064901 A1 | 4/2016 |
| WO | 2017/008121 A1 | 1/2017 |

OTHER PUBLICATIONS

International Search Report for International Application No. PCT/AU2017/050001 dated Mar. 27, 2017 (8 pages).
International Search Report for International Application No. PCT/AU2016/050619 dated Oct. 2016 (27 pages).
International Written Opinion for International Application No. PCT/AU2017/050001 dated Mar. 27, 2017 (11 pages).
International Written Opinion for International Application No. PCT/AU2016/050619 dated Oct. 6, 2016 (9 pages).
Linden "Iterative Channel Estimation in LTE Uplink." Master's Degree Project, Stockholm, Sweden (2014/) pp. 1-72.
Spencer et al. "Zero-forcing methods for downlink spatial multiplexing in multiuser MIMO channels." IEEE Transactions on Signal Processing, vol. 52, No. 2. (Feb. 2004) pp. 461-471.

* cited by examiner

MULTI-USER MIMO-OFDM SYSTEM

This application is a Continuation in Part of International Application No. PCT/AU2016/050619, filed 14 Jul. 2016, which claims benefit of Serial No. 2015902780, filed 14 Jul. 2015, and Serial Number 2015902781 filed 14 Jul. 2015, and Serial Number 2015902782 filed 14 Jul. 2015 in Australia and which application are incorporated herein by reference. This application is a Continuation in Part of International Application No. PCT/AU2017/05001 filed 3 Jan. 2017 which application is incorporated herein by reference. To the extent appropriate, a claim of priority is made to each of the above disclosed applications.

FIELD OF INVENTION

The present invention relates generally to wireless communication and, in particular, to multi-user multiple-input multiple-output orthogonal frequency division multiplexing (MU-MIMO-OFDM) wireless communication systems.

BACKGROUND

The use of multi-user multiple-input multiple-output orthogonal frequency division multiplexing (MU-MIMO-OFDM) has been considered for next-generation wireless systems. FIG. 1 shows an example of MU-MIMO-OFDM system where the central access point (AP), equipped with $N_{AP}$ antennas, communicates with $N_{UT}$ user terminals (UTs), each equipped with a single antenna. Wireless OFDM links between the AP and the UTs can be established at the same time using the same radio frequency, improving the spectrum efficiency of the system, ideally, by the minimum of $N_{AP}$ and $N_{UT}$, compared to a conventional single-transmitter-single-receiver system. This mode of operation is also known as space division multiple access (SDMA). Uplink MU-MIMO-OFDM transmission (from UTs to AP) can be realised by the AP receiver having an accurate knowledge of the uplink channel. Downlink MU-MIMO-OFDM transmission (from AP to UTs) can be realised by the AP transmitter having an accurate knowledge of the downlink channel.

One of the challenges to realise a successful implementation of a MU-MIMO-OFDM system achieving higher spectrum efficiency is to have an efficient and accurate channel estimation method. Basically, channel estimation errors degrade achievable signal to noise plus interference ratio (SNIR), both for uplink and downlink, which in turn degrades achievable data transfer rates.

Accurate estimation of OFDM channel is typically performed by sending symbols known by the receiver in advance. Such symbols known by the receiver in advance for the purpose of channel estimation are referred as channel training symbols. The longer the time the system spends sending known symbols for channel estimation, the shorter the time the system can spend for sending information. The time that the system spends for channel estimation is referred as channel training overheads. Typically, the channel training overheads increases with the number of transmitters, as the estimation of the channel is required for each active transmitter. A method for efficiently and accurately estimating channels in the presence of a large number of transmitters is called for.

One known method for performing channel estimation is to use comb-pilot sub-carriers with phase slope estimation in the presence of OFDM frame timing offset. Generally, conventional channel estimation methods that use comb-pilot sub-carriers estimate the channel coefficients at comb-pilot sub-carriers and then compute the channel coefficients of the remaining sub-carriers by interpolating the estimated channel coefficients of the comb-pilot sub-carriers.

As shown in FIG. 2, the conventional comb-pilot sub-carrier arrangement places comb-pilot sub-carriers uniformly along the frequency. This example shows an interpolation factor of 4 with equal spacing between comb-pilot sub-carriers. This conventional equally spaced arrangement was previously recommended in the absence of prior knowledge about the channel. This conventional equally spaced arrangement is also known to be beneficial in utilising certain types of interpolation methods, such as transform-domain processing. Previously, the phase slope of the channel coefficients along the frequency was estimated by the estimated channel coefficients of equally spaced comb-pilot sub-carriers, which inevitably has a larger variation due to the larger spacing of the comb-pilot sub-carriers.

The spectrum efficiency of an OFDM communication link improves by using less sub-carriers for pilot and more sub-carriers for transmitting data. The ratio of the number of comb-pilot sub-carriers over the number of all sub-carriers for which the channel coefficients are calculated by the interpolation is known as the interpolation factor. There is a trade-off between achieving higher spectrum efficiency and degradation in channel estimation accuracy by using a larger interpolation factor.

In practice OFDM frame timing offset causes fast phase changes in estimated channel coefficients of the comb-pilot sub-carriers, and results in significant error in estimating channel coefficients at remaining sub-carriers by interpolation. Previously proposed methods were found to work well up to the OFDM frame timing offset in terms of $N/(2 F)$ baseband samples, where N is the number of baseband samples per OFDM frame and F is the interpolation factor.

However, currently there is no known method that can allow the OFDM frame timing offset larger than $N/(2 F)$ without ambiguity.

Another of the challenges is to have an efficient and accurate channel state feedback method for a MU-MIMO-OFDM system. Generally, the access point is equipped with multiple transmitters communicating with multiple user terminals each having one or more receiving antennas. With the access point knowing the downlink channel coefficients, the spectrum efficiency of the multi-user MIMO downlink can increase linearly with the number of transmitters at the access point, provided sufficient number of users are present in the system.

In order to perform downlink MU-MIMO-OFDM, the access point transmitters need to know the downlink channel. The access point can identify the downlink channel by 1) estimating the downlink channel at each user terminal by sending channel training symbols in a first time period, and 2) receiving the estimated downlink channel information from each user terminal in a second time period. The longer the MU-MIMO-OFDM system spends sending estimated downlink channel information, the shorter the time the MU-MIMO-OFDM system can spend sending information. The time that system spends feeding back estimated channel information is referred as channel feedback overheads. Channel feedback overheads may be reduced if channel information is compressed with some loss of information, referred to as channel compression. Typically, the time required for the system to feedback the channel information increases with the number of transmitter, as the channel information is required for each active transmitter.

A number of well-known channel state feedback schemes have been previously investigated including analog feedback and vector quantisation. It has been concluded from these investigations that the most suitable method in terms of simplicity and overhead minimisation for multi-user MIMO-OFDM is to use time-domain quantisation. This has therefore lead to the use of discrete Fourier transform (DFT) based channel compression for the purposes of efficient channel feedback in multi-user MIMO-OFDM communication. DFT based channel compression has been shown to theoretically outperform other known channel compression methods. The use of DFT to transform frequency domain channel coefficients into time domain impulse response coefficients and the use of scalar uniform quantisation with some (unspecified) bit-allocation scheme was suggested to quantise the time domain impulse response real and imaginary coefficients. The method was shown to achieve better sum rates over previous methods analytically.

Anther particular challenge to realise a successful implementation of a MU-MIMO-OFDM systems is to reduce the required computational complexity. Zero-forcing detection and zero-forcing pre-coding are known as low complexity linear receiver and pre-coder for MU-MIMO-OFDM uplink and downlink. However, even with these linear low-complexity methods, the computational complexity required for zero-forcing based uplink and downlink MU-MIMO-OFDM can increase dramatically, as both methods involve inversion of a channel matrix, wherein the matrix size can become large with a large number of transmitters.

Interpolation of channel inverse in point-to-point MIMO-OFDM communication was proposed previously. In particular, the interpolation of channel inverse is achieved by performing interpolation separately of the adjoint and determinant of the channel matrix. This is expressed as follows:

$$H^{-1}(i_F) = \frac{adj\, H(i_F)}{\det H(i_F)}$$

where H is the channel matrix. It was concluded that interpolating the channel matrix from a smaller set of inverses will, in general, not be possible.

A method for interpolation-based QR decomposition in MIMO-OFDM systems has also previously been proposed. This method is applicable to point-to-point MIMO channels as well as point-to-multipoint multi-user MIMO channel that requires per-tone QR decomposition. In this method, the interpolation is performed separately on Q (i.e. the orthogonal matrix) and R (i.e. the upper triangular matrix) matrices of the channel matrix.

There is therefore a need to alleviate one or more of the above mentioned challenges or provide a useful alternative.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates.

SUMMARY

Aspects of the present invention discloses various improvements to multi-user multiple-input multiple-output orthogonal frequency division multiplexing (MU-MIMO-OFDM) wireless communication systems. In one aspect there is disclosed an efficient and accurate channel estimation method and system using locally consecutive pilot sub-carriers. In another aspect there is disclosed an efficient channel feedback method and system by applying a discrete cosine transform to channel coefficients. In another aspect there is disclosed an efficient method and system to calculate channel inverse by direct interpolation. These aspects can be used separately or in combination to improve the MU-MIMO-OFDM system.

In a first aspect there is provided a method including:
estimating, by a receiving device, channel coefficients of pilot sub-carriers for a multi-user multiple-input multiple-output orthogonal frequency division multiplexing (MU-MIMO OFDM) system, the pilot sub-carriers including locally consecutive pilot sub-carriers;
estimating, by the receiving device, a phase slope by using the estimated channel coefficients at the locally consecutive pilot sub-carriers;
removing, by the receiving device, the phase slope from the estimated channel coefficients at the pilot sub-carriers to obtain phase slope removed estimated channel coefficients; and
determining, by the receiving device, phase slope removed estimated channel coefficients of one or more remaining sub-carriers by interpolation using the phase slope removed estimated channel coefficients.

In certain embodiments, the receiving device is able to estimate the phase slope without ambiguity up to N/2, where N is a number of baseband samples per OFDM frame for the MU-MIMO OFDM system.

In certain embodiments, the phase slope is calculated according to Equation 5.

In certain embodiments, removing the phase slope from the estimated channel coefficients at the pilot sub-carriers is performed according to Equation 6.

In certain embodiments, interpolating the phase slope removed estimated channel coefficients at the one or more remaining sub-carriers includes linear interpolation.

In certain embodiments, the linear interpolation is performed according to Equation 7.

In certain embodiments, the method includes applying the phase slope to the phase slope removed estimated channel coefficients at the pilot sub-carriers according to Equation 8.

In certain embodiments, the receiving device is a user terminal.

In certain embodiments, the receiving device is an access point.

In certain embodiments where the receiving device is a user terminal, the method includes:
performing, by the user terminal, a discrete cosine transform (DCT) of the phase slope removed estimated channel coefficients at the pilot sub-carriers and the one or more remaining sub-carriers to obtain DCT channel coefficients;
quantising, by the user terminal, the DCT channel coefficients to obtain quantised DCT channel coefficients;
transferring, from the user terminal to an access point, the quantised DCT channel coefficients; and
performing, by the access point, an inverse discrete cosine transform (IDCT) of the quantised DCT channel coefficients to obtain the phase slope removed estimated channel coefficients at the pilot sub-carriers and the one or more remaining sub-carriers in the frequency domain.

In certain embodiments, the DCT channel coefficients include real DCT channel coefficients determined according to Equation 9 and imaginary DCT channel coefficients determined according to Equation 10.

In certain embodiments, bit allocation for quantising the DCT channel coefficients to obtain quantised DCT channel coefficients is based on maximum channel coefficient amplitudes for each of the DCT channel coefficients used.

In certain embodiments, performing the IDCT of the quantised DCT channel coefficients includes performing the IDCT upon a quantized real part of the quantised DCT channel coefficients according to Equation 11 and performing the IDCT upon a quantized imaginary part of the quantised DCT channel coefficients according to Equation 12 such that the phase slope removed channel coefficients at the pilot sub-carriers and the one or more remaining sub-carriers are restored in the frequency domain according to Equation 13.

In certain embodiments where the receiving device is the access device, the method includes performing uplink signal processing including:

interpolating, by the access point using the phase slope removed estimated channel coefficients at the pilot subcarriers and the one or more remaining sub-carriers, phase slope removed estimated channel coefficients at channel inverse sub-carriers;

performing, by the access point, channel inversion using the phase slope removed estimated channel coefficients at the channel inverse sub-carriers to obtain an initial portion of elements of a channel inverse;

interpolating, by the access point, a remaining portion of elements of the channel inverse using the initial portion of elements; and performing, by the access point, zero-forcing detection upon OFDM data symbols received from a user terminal using the channel inverse, wherein the phase slope is applied to reconstructed transmitted symbols.

In certain embodiments where the receiving device is the user terminal, the method includes performing downlink signal processing including:

receiving, by an access point from the user terminal, the phase slope removed estimated channel coefficients at the pilot sub-carriers and the one or more remaining sub-carriers;

interpolating, by the access point using the phase slope removed estimated channel coefficients at the pilot sub-carriers and the one or more remaining sub-carriers, phase slope removed estimated channel coefficients at channel inverse sub-carriers;

performing, at the access point, channel inversion using the phase slope removed estimated channel coefficients at the channel inverse sub-carriers to obtain an initial portion of elements of a channel inverse;

interpolating, by the access point, a remaining portion of elements of the channel inverse using the initial portion of elements;

transmitting, from the access point to the user terminal, an OFDM training symbol pre-coded with the channel inverse to allow the user terminal to determine an estimated pre-coded channel; and transmitting, from the access point to the user terminal, OFDM data symbols pre-coded with the channel inverse such that the user terminal is able to perform zero-forcing detection using the estimated pre-coded channel.

In certain embodiments where the receiving device is the user terminal, the method includes performing downlink signal processing including:

performing, by the user terminal, a discrete cosine transform (DCT) of the phase slope removed estimated channel coefficients at the pilot sub-carriers and the one or more remaining sub-carriers to obtain DCT channel coefficients;

quantising, by the user terminal, the DCT channel coefficients to obtain quantised DCT channel coefficients;

transferring, from the user terminal to an access point, the quantised DCT channel coefficients; and performing, by the access point, an inverse discrete cosine transform (IDCT) of the quantised DCT channel coefficients to obtain the phase slope removed estimated channel coefficients at the pilot sub-carriers and the one or more remaining sub-carriers in the frequency domain;

interpolating, by the access point using the phase slope removed estimated channel coefficients at the pilot subcarriers and the one or more remaining sub-carriers, phase slope removed estimated channel coefficients at channel inverse sub-carriers;

performing, at the access point, channel inversion using the phase slope removed estimated channel coefficients at the channel inverse sub-carriers to obtain an initial portion of elements of a channel inverse;

interpolating, by the access point, a remaining portion of elements of the channel inverse using the initial portion of elements;

transmitting, from the access point to the user terminal, an OFDM training symbol pre-coded with the channel inverse to allow the user terminal to determine an estimated pre-coded channel; and transmitting, from the access point to the user terminal, OFDM data symbols pre-coded with the channel inverse to allow the user terminal to perform zero-forcing detection using the estimated pre-coded channel.

In a second aspect there is provided a receiving device configured to:

estimate channel coefficients of pilot sub-carriers for a multi-user multiple-input multiple-output orthogonal frequency division multiplexing (MU-MIMO OFDM) system, the pilot sub-carriers including locally consecutive pilot sub-carriers;

estimate a phase slope by using the estimated channel coefficients at the locally consecutive pilot sub-carriers;

remove the phase slope from the estimated channel coefficients at the pilot sub-carriers to obtain phase slope removed estimated channel coefficients; and determine phase slope removed estimated channel coefficients of one or more remaining sub-carriers by interpolation using the phase slope removed estimated channel coefficients.

In certain embodiments, the receiving device is configured to estimate the phase slope without ambiguity up to $N/2$, where N is a number of baseband samples per OFDM frame for the MU-MIMO OFDM system.

In certain embodiments, the receiving device is configured to calculate the phase slope according to Equation 5.

In certain embodiments, the receiving device is configured to remove the phase slope from the estimated channel coefficients of the pilot sub-carriers according to Equation 6.

In certain embodiments, the receiving device is configured to interpolate the phase slope removed estimated channel coefficients at the one or more remaining sub-carriers using linear interpolation.

In certain embodiments, the receiving device is configured to perform linear interpolation according to Equation 7.

In certain embodiments, the receiving device is configured to apply the phase slope to the phase slope removed estimated channel coefficients at the pilot sub-carriers according to Equation 8.

In certain embodiments, the receiving device is a user terminal.

In certain embodiments, the receiving device is an access point.

In certain embodiments where the receiving device is the user terminal, the user terminal is configured to:

perform, using a discrete cosine transform (DCT) of the phase slope removed estimated channel coefficients at the pilot sub-carriers and the one or more remaining sub-carriers to obtain DCT channel coefficients;

quantise the DCT channel coefficients to obtain quantised DCT channel coefficients; and transfer, to an access point, the quantised DCT channel coefficients such that the access point is able to perform an inverse discrete cosine transform (IDCT) of the quantised DCT channel coefficients to obtain the phase slope removed estimated channel coefficients at the pilot sub-carriers and the one or more remaining sub-carriers in the frequency domain.

In certain embodiments, the DCT channel coefficients include real DCT channel coefficients determined according to Equation 9 and imaginary DCT channel coefficients determined according to Equation 10.

In certain embodiments, the user terminal is configured to quantize the DCT channel coefficients to obtain quantised DCT channel coefficients, wherein bit allocation for quantisation is based on maximum channel coefficient amplitudes for each of the DCT channel coefficients used.

In a third aspect there is provided a system including:

a receiving device configured as described which transfers the quantised DCT channel coefficients; and an access point configured to perform an inverse discrete cosine transform (IDCT) of the quantised DCT channel coefficients to obtain the phase slope removed estimated channel coefficients in the frequency domain.

In certain embodiments, the access point is configured to perform the IDCT of the quantised DCT channel coefficients by performing the IDCT upon a quantized real part of the quantised DCT channel coefficients according to Equation 11 and performing the IDCT upon a quantized imaginary part of the quantised DCT channel coefficients according to Equation 12 such that the phase slope removed channel coefficients is restored in the frequency domain according to Equation 13.

In a fourth aspect there is provided a system including:

a receiving device configured according to the second aspect, wherein the receiving device is an access device configured to perform uplink signal processing, wherein the access point is configured to:

interpolate, using the phase slope removed estimated channel coefficients at the pilot sub-carriers, phase slope removed estimated channel coefficients at channel inverse sub-carriers;

perform channel inversion using the phase slope removed estimated channel coefficients at the channel inverse sub-carriers to obtain an initial portion of elements of a channel inverse;

interpolate a remaining portion of elements of the channel inverse using the initial portion of elements; and perform zero-forcing detection upon OFDM data symbols received from a user terminal using the channel inverse, wherein the phase slope is applied to reconstructed transmitted symbols.

In a fifth aspect there is provided a system including:

a receiving device configured according to the second aspect, wherein the receiving device is a user terminal; and an access point configured to perform downlink signal processing, wherein the access point is configured to:

receive, from a user terminal, the phase slope removed estimated channel coefficients at the pilot sub-carriers and the one or more remaining sub-carriers;

interpolate, using the phase slope removed estimated channel coefficients at the pilot subcarriers and the one or more remaining sub-carriers, phase slope removed estimated channel coefficients at channel inverse sub-carriers;

perform channel inversion using the phase slope removed estimated channel coefficients at channel inverse sub-carriers to obtain an initial portion of elements of a channel inverse;

interpolate a remaining portion of elements of the channel inverse using the initial portion of elements;

transmit, to the user terminal, an OFDM training symbol pre-coded with the channel inverse to allow the user terminal to determine an estimated pre-coded channel; and transmit, from the access point to the user terminal, OFDM data symbols pre-coded with the channel inverse to allow the user terminal to perform zero-forcing detection using the estimated pre-coded channel.

In a sixth aspect there is provided a system including:

a receiving device configured according to the second aspect, wherein the receiving device is a user terminal, wherein the user terminal is configured to:

perform a discrete cosine transform (DCT) of the phase slope removed estimated channel coefficients at the pilot sub-carriers and the one or more remaining sub-carriers to obtain DCT channel coefficients;

quantise the DCT channel coefficients to obtain quantised DCT channel coefficients; and transfer, to an access point, the quantised DCT channel coefficients; and the access point configured to perform downlink signal processing, wherein the access point is configured to:

perform an inverse discrete cosine transform (IDCT) of the quantised DCT channel coefficients to obtain the phase slope removed estimated channel coefficients at the pilot sub-carriers and the one or more remaining sub-carriers in the frequency domain;

interpolate, using the phase slope removed estimated channel coefficients at the pilot subcarriers and the one or more remaining sub-carriers, phase slope removed estimated channel coefficients at channel inverse sub-carriers;

perform channel inversion using the phase slope removed estimated channel coefficients at channel inverse sub-carriers to obtain an initial portion of elements of a channel inverse;

interpolate a remaining portion of elements of the channel inverse using the initial portion of elements;

transmit, to the user terminal, an OFDM training symbol pre-coded with the channel inverse to allow the user terminal to determine an estimated pre-coded channel; and transmit, to the user terminal, OFDM data symbols pre-coded with the channel inverse to allow the user terminal to perform zero-forcing detection using the estimated pre-coded channel.

In certain embodiments, the DCT channel coefficients include real DCT channel coefficients determined according to Equation 9 and imaginary DCT channel coefficients determined according to Equation 10.

In certain embodiments, the user terminal is configured to quantize the DCT channel coefficients to obtain quantised DCT channel coefficients, wherein bit allocation for quantisation is based on maximum channel coefficient amplitudes for each of the DCT channel coefficients used.

In certain embodiments, the access point is configured to perform the IDCT of the quantised DCT channel coefficients by performing the IDCT upon a quantized real part of the quantised DCT channel coefficients according to Equation 11 and performing the IDCT upon a quantized imaginary part of the quantised DCT channel coefficients according to Equation 12 such that the phase slope removed estimated channel coefficients are restored in the frequency domain according to Equation 13.

In a seventh aspect there is provided a method of performing channel feedback compression in a multi-user multiple-input multiple-output orthogonal frequency division multiplexing (MU-MIMO OFDM) system, wherein the method includes:

performing, by a user terminal, a discrete cosine transform (DCT) of a plurality of channel coefficients to obtain DCT channel coefficients;

quantizing, by the user terminal, the DCT channel coefficients to obtain quantised DCT channel coefficients;

transferring, from the user terminal to an access point, the quantised DCT channel coefficients; and performing, by the access point, an inverse discrete cosine transform (IDCT) of the quantised DCT channel coefficients to obtain the plurality of channel coefficients in the frequency domain.

In certain embodiments, the DCT channel coefficients include real DCT channel coefficients determined according to Equation 9 and imaginary DCT channel coefficients determined according to Equation 10.

In certain embodiments, bit allocation for quantising the DCT channel coefficients to obtain quantised DCT channel coefficients is based on maximum channel coefficient amplitudes for each of the DCT channel coefficients used.

In certain embodiments, performing the IDCT of the quantised DCT channel coefficients includes performing the IDCT upon a quantized real part of the quantised DCT channel coefficients according to Equation 11 and performing the IDCT upon a quantized imaginary part of the quantised DCT channel coefficients according to Equation 12 such that the plurality of channel coefficients in the frequency domain are restored according to Equation 13.

In an eighth aspect there is provided a multi-user multiple-input multiple-output orthogonal frequency division multiplexing (MU-MIMO OFDM) system configured to perform channel feedback compression, wherein the system includes:

a plurality of user terminals, wherein each user terminal is configured to:
  perform a discrete cosine transform (DCT) of a plurality of channel coefficients to obtain DCT channel coefficients;
  quantize the DCT channel coefficients to obtain quantised DCT channel coefficients; and
  transfer to an access point, the quantised DCT channel coefficients; and
the access point configured to:
  receive the quantised DCT channel coefficients from each user terminal; and
  perform, upon the quantised DCT channel coefficients received from each terminal, an inverse discrete cosine transform (IDCT) of the quantised DCT channel coefficients to obtain the plurality of channel coefficients in the frequency domain for the respective user terminal.

In certain embodiments, the respective DCT channel coefficients obtained by each user terminal include real DCT channel coefficients determined according to Equation 9 and imaginary DCT channel coefficients determined according to Equation 10.

In certain embodiments, each user terminal is configured to quantize the respective DCT channel coefficients, wherein bit allocation for quantisation is based on maximum channel coefficient amplitudes for each of the DCT channel coefficients used.

In certain embodiments, the access point is configured to perform the IDCT of each set of quantised DCT channel coefficients by performing the IDCT upon a respective quantized real part of each set of quantised DCT channel coefficients according to Equation 11 and by performing the IDCT upon a respective quantized imaginary part of each set of quantised DCT channel coefficients according to Equation 12 such that the plurality of channel coefficients for each user terminal are restored in the frequency domain according to Equation 13.

In another aspect there is provided a MU-MIMO OFDM system including a plurality of user terminals and an access point:

wherein during uplink signal processing, the access point is configured to:
  estimate, based on a uplink channel training OFDM symbol from each user terminal, uplink estimated channel coefficients of pilot sub-carriers, the pilot sub-carriers including locally consecutive pilot sub-carriers;
  estimate an uplink phase slope by using the uplink estimated channel coefficients at the locally consecutive pilot sub-carriers;
  remove the uplink phase slope from the uplink estimated channel coefficients at the pilot sub-carriers to obtain phase slope removed uplink estimated channel coefficients;
  determine phase slope removed uplink estimated channel coefficients of one or more remaining sub-carriers by interpolation using the phase slope removed uplink estimated channel coefficients at the pilot sub-carriers;
  interpolate, using the phase slope removed uplink estimated channel coefficients at the pilot sub-carriers and the one or more remaining sub-carriers, phase slope removed uplink estimated channel coefficients at channel inverse sub-carriers;
  perform channel inversion using the phase slope removed uplink estimated channel coefficients at the channel inverse sub-carriers to obtain an initial portion of elements of an uplink channel inverse;
  interpolate a remaining portion of elements of the uplink channel inverse using the initial portion of elements of the uplink channel inverse; and
  perform zero-forcing detection upon OFDM data symbols received from each user terminal using the respective uplink channel inverse, wherein the phase slope is applied to reconstructed transmitted symbols;

wherein during downlink signal processing, each user terminal is configured to:
  estimate, using downlink channel training OFDM symbols received from the access point, downlink estimated channel coefficients of the pilot sub-carriers;
  estimate a downlink phase slope by using the downlink estimated channel coefficients at the locally consecutive pilot sub-carriers;
  remove the downlink phase slope from the downlink estimated channel coefficients at the pilot sub-carriers to obtain phase slope removed downlink estimated channel coefficients at the pilot sub-carriers;

determine phase slope removed estimate channel coefficients of one or more remaining sub-carriers by interpolation using the phase slope removed estimated channel coefficients at the pilot sub-carriers;

perform a discrete cosine transform (DCT) of the phase slope removed downlink estimated channel coefficients at the pilot sub-carriers to obtain DCT downlink channel coefficients;

quantise the DCT downlink estimated channel coefficients to obtain quantised DCT downlink channel coefficients; and transfer to the access point, the quantised DCT downlink channel coefficients; and wherein during the downlink signal processing for each user terminal, the access point is configured to:

receive, from each user terminal, the quantised DCT downlink channel coefficients;

perform an inverse discrete cosine transform (IDCT) of the quantised DCT downlink channel coefficients to obtain the phase slope removed downlink estimated channel coefficients at the pilot sub-carriers in the frequency domain;

interpolate, using the phase slope removed downlink estimated channel coefficients at the pilot sub-carriers, phase slope removed downlink estimated channel coefficients at the channel inverse sub-carriers;

perform channel inversion using the phase slope removed downlink estimated channel coefficients at the channel inverse sub-carriers to obtain an initial portion of elements of a downlink channel inverse for the respective user terminal;

interpolate a remaining portion of elements of the downlink channel inverse using the initial portion of elements of the downlink channel inverse;

transmit, to each user terminal, a downlink OFDM training symbol pre-coded with the respective downlink channel inverse to allow each respective user terminal to determine an estimated pre-coded channel; and transmit, to each user terminal, OFDM data symbols pre-coded with the respective downlink channel inverse to allow each respective user terminal to perform zero-forcing detection using the estimated pre-coded channel.

Other aspects and embodiments will be appreciated throughout the detailed description of the example embodiments.

DESCRIPTION OF DRAWINGS

Example embodiments should become apparent from the following description, which is given by way of example only, of at least one preferred but non-limiting embodiment, described in connection with the accompanying figures.

DETAILED DESCRIPTION

Figure 1:
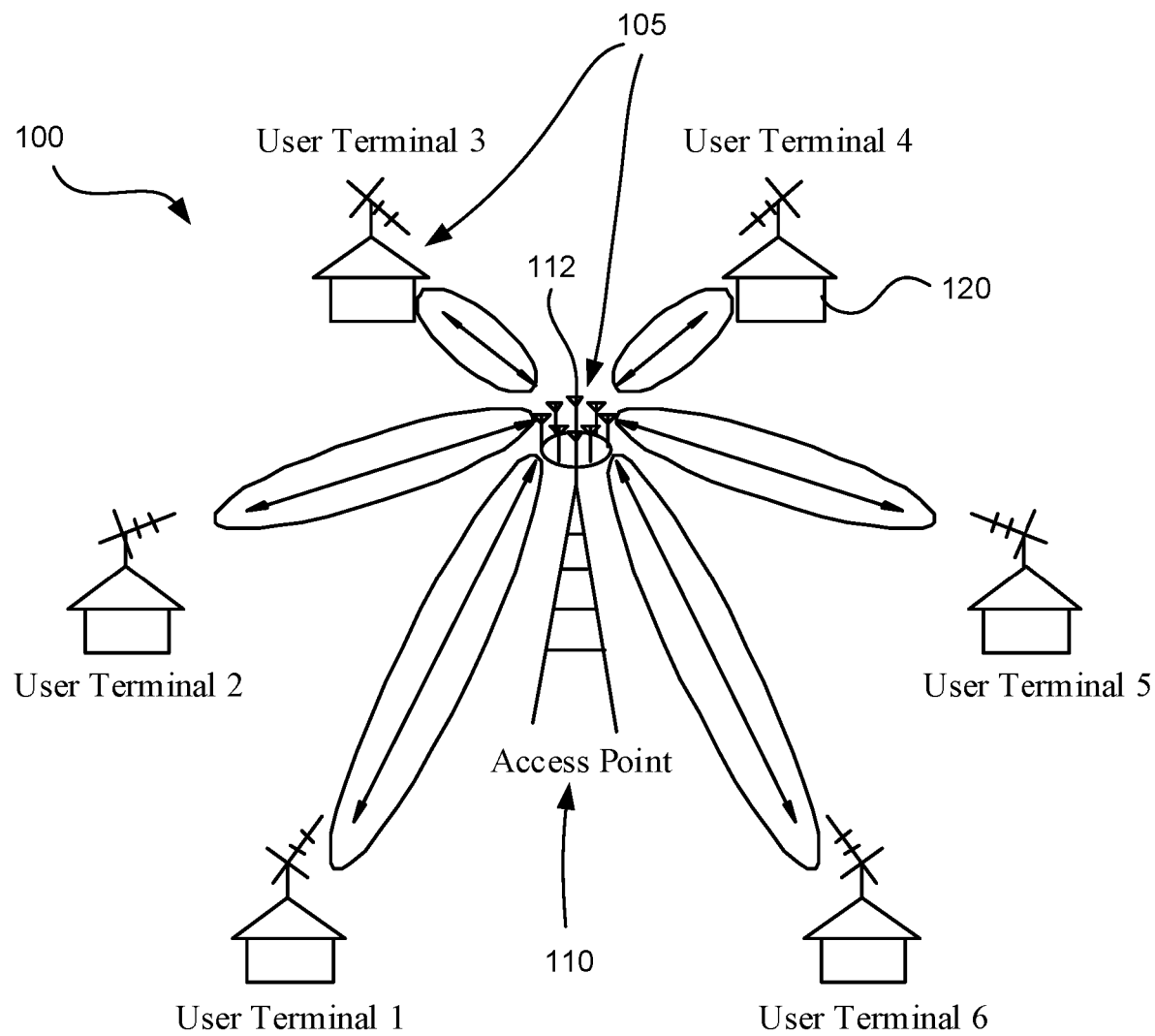
FIG. 1 is an example of MU-MIMO-OFDM system.

Where reference is made in any one or more of the accompanying drawings to steps and/or features, which have the same reference numerals, those steps and/or features have for the purposes of this description the same function(s) or operation(s), unless the contrary intention appears.

It will be appreciated that the term "channel inverse" refers to the pseudo inverse matrix of a channel matrix. Coherence of the channel matrix as a function of frequency is utilised to reduce the number of calculations performed to calculate the channel inverse. An initial portion of the channel inverse is calculated only at selected sub-carriers (herein referred to as the channel inverse sub-carriers) and a remaining portion of the channel inverse at remaining sub-carriers is calculated by some form of interpolation/extrapolation.

Figure 3:
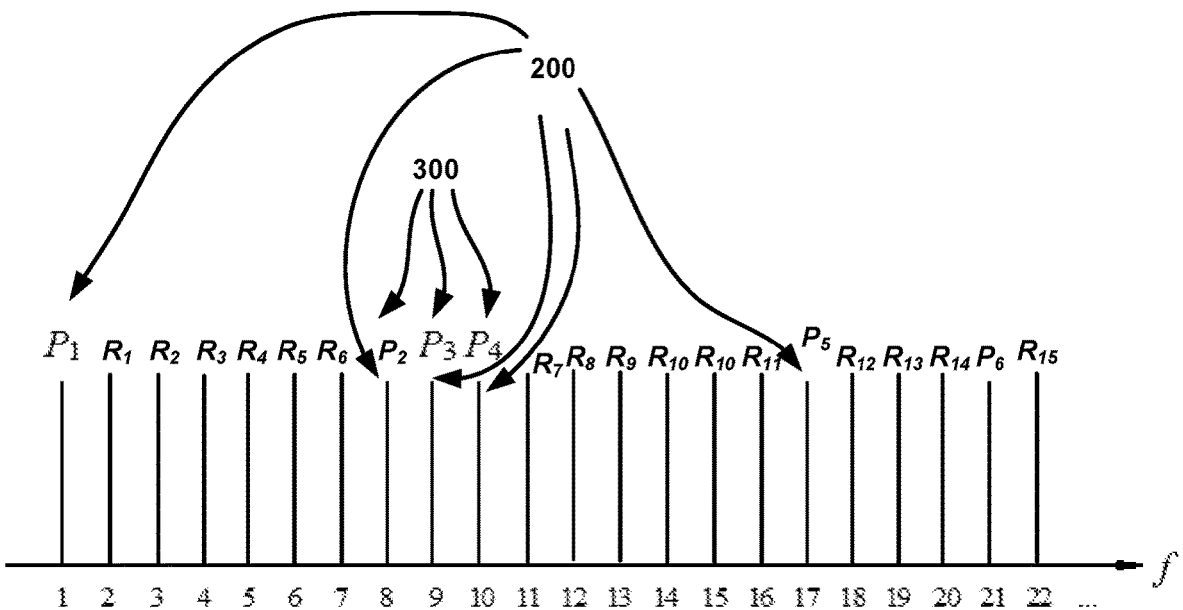
FIG. 3 is an example of a pilot sub-carrier arrangement including locally consecutive pilot sub-carriers.

Referring to FIG. 3 there is shown an example pilot sub-carrier arrangement including pilot sub-carriers 200 which in turn include locally consecutive pilot sub-carriers 300.

Figure 2:
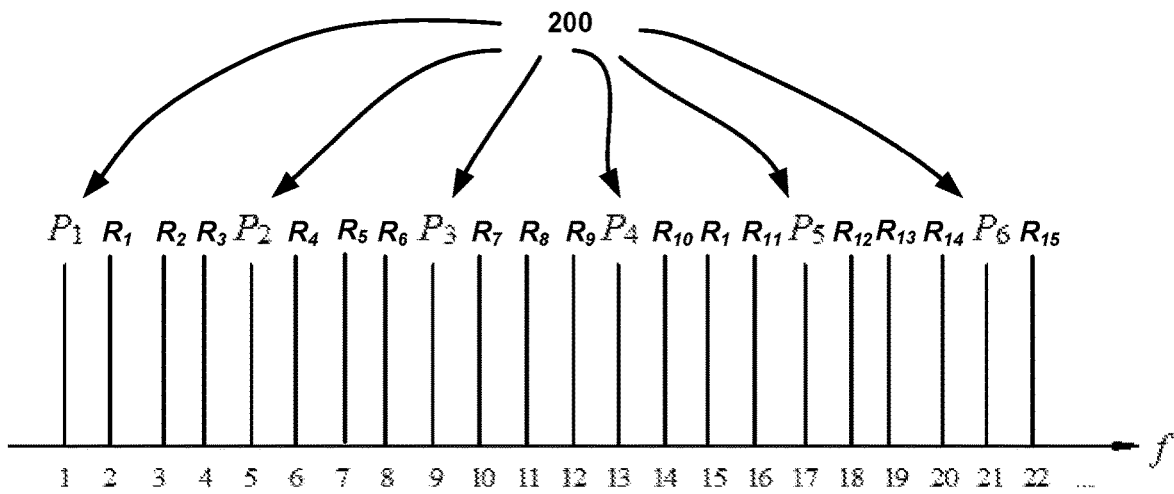
FIG. 2 is an example of a conventional pilot sub-carrier arrangement.

In this example, the location of the original comb-pilot sub-carriers $P_2$ and $P_4$ (relative to the conventional equally spaced arrangement depicted in FIG. 2) are shifted to form locally consecutive pilot sub-carrier 300 around $P_3$. A locally consecutive pilot sub-carrier 300 is spaced more closely to another locally consecutive pilot sub-carrier 300 compared to another pilot sub-carrier 200 which is not a locally consecutive pilot sub-carrier.

Phase slope estimation can then be performed by using the estimated channel coefficients at the locally consecutive pilot sub-carriers 300. Advantageously, the phase slope can be estimated without ambiguity up to N/2. Furthermore, spectrum efficiency is not compromised by allocating the same number of comb-pilot sub-carriers to that which is shown in FIG. 2.

The channel estimation accuracy may be degraded for the sub-carriers around the original comb-pilot sub-carriers which have been shifted ($P_2$ and $P_4$ in FIG. 3), however the effects are found to be negligible in the overall performance as shown below by the computer simulation which is discussed in relation to FIGS. 5A and 5B.

While the above example uses three locally consecutive pilot sub-carriers 300, two or more locally consecutive pilot sub-carriers can be implemented. One or more groups of locally consecutive pilot sub-carriers 300 can be defined and the estimation of the phase slope can be performed by weighted average on the basis of pilot sub-carrier amplitude.

Figure 4:
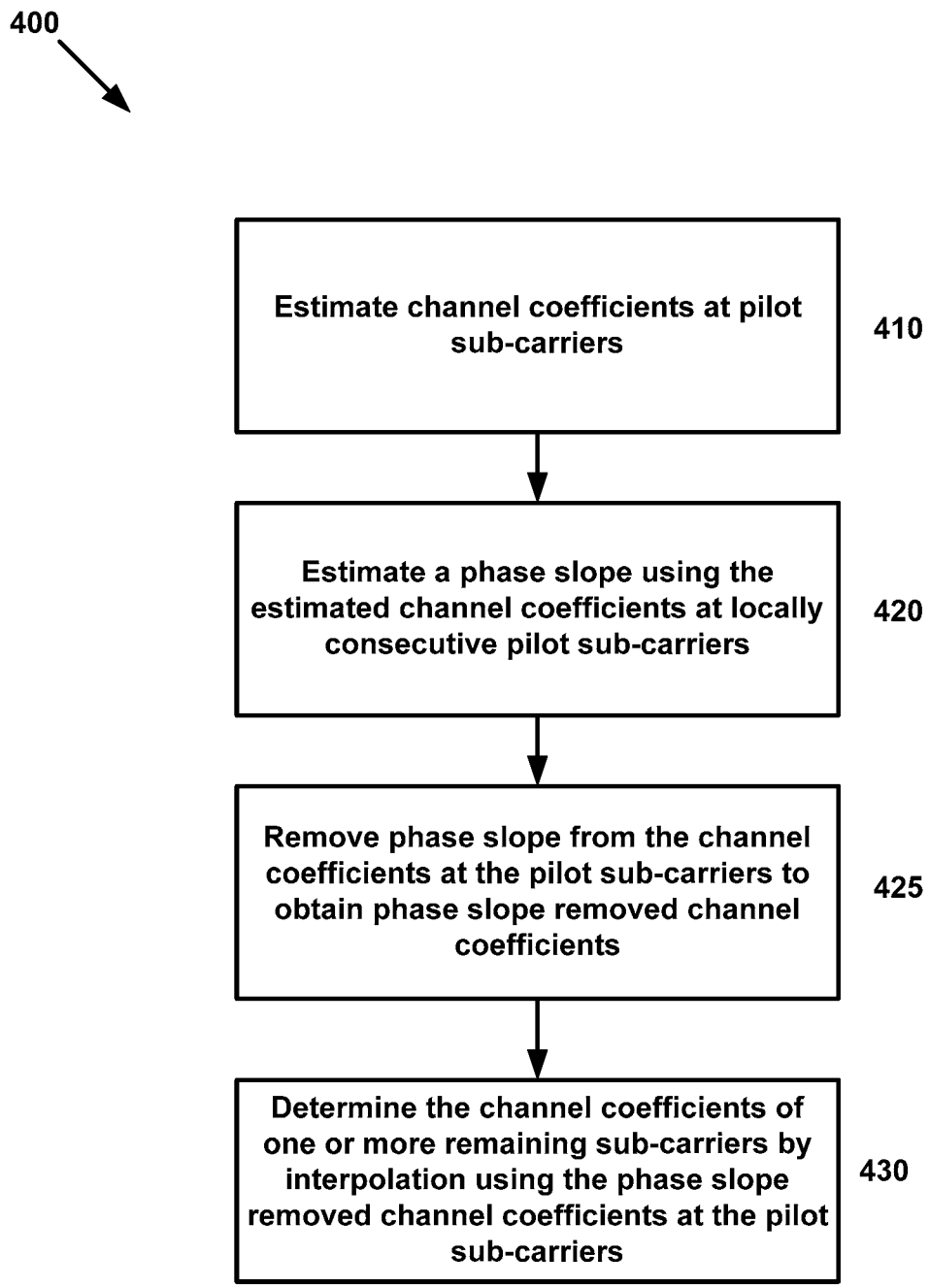
FIG. 4 is an example of a method performed by a receiving device for performing channel estimation.

Referring to FIG. 4 there is shown a flow chart representing a method 400 performed by a wireless device 105 such as a receiving device or receiver in a MU-MIMO-OFDM system 100. In particular, at step 410 the method 400 includes estimating channel coefficients at pilot sub-carriers including locally consecutive pilot sub-carriers 300. At step 420, the method 400 includes estimating a phase slope by using the estimated channel coefficients at the locally consecutive pilot sub-carriers 300. At step 425, the method 400 includes removing the phase slope from the estimated channel coefficients at the pilot sub-carriers to obtain phase slope removed estimated channel coefficients. At step 430, the method includes determining phase slope removed estimated channel coefficients of remaining sub-carriers $P_1$, $P_1$, $P_6$, $R_1$-$R_{15}$, by interpolation using the phase slope removed estimated channel coefficients at the pilot sub-carriers. In one example the one or more remaining sub-carriers carriers $P_1$, $P_1$, $P_6$, $R_1$-$R_{15}$ can be other pilot sub-carriers $P_1$, $P_1$, $P_6$ for which estimated channel coefficients were not determined in step 410.

It will be appreciated that the estimated channel coefficients at the sub-carriers 200 (including locally consecutive pilot sub-carriers and the remaining sub-carriers) can then be used to precode data to be wirelessly transmitted or decode data wirelessly received by the receiving device 105. It will also be appreciated that the receiving device 105 may be an access point 110 an/or a user terminal 120.

Figure 5A:
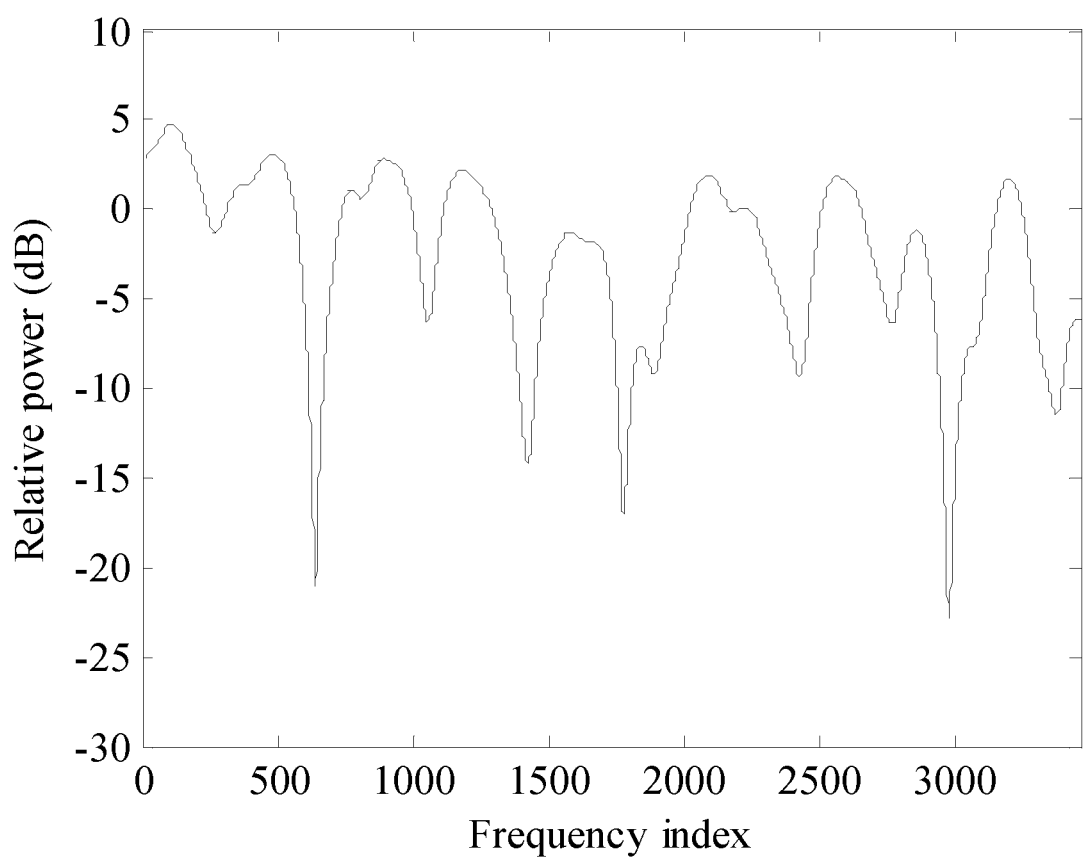
FIG. 5A is an example OFDM channel frequency response.

Referring to FIG. 5A there is shown an example OFDM channel frequency response simulated utilising locally consecutive pilot sub-carriers 300. In particular, in this simulation, an OFDM system with 3,456 sub-carriers with sub-carrier spacing of 3.90625 kHz (i.e. 8 MHz/2048) was considered.

The interpolation factor was set to 4, with the number of comb-pilot sub-carriers being 864 (i.e. 3,456/4). Two groups of five locally consecutive pilot sub-carriers 300 were defined for the simulation, one at a lower frequency (817 to 821) and another at a higher frequency (2609 to 2613) in order to take advantage of frequency diversity. The total number of comb-pilot sub-carriers was the same for the locally consecutive pilot sub-carriers method and the conventional equally spaced sub-carrier method. Channel simulation was performed at IF using 10,240 FFT. Cyclic prefix of length ¼ of the OFDM symbol length was used, which corresponds to 2,560 IF samples (i.e. 10,240/4). Simple real and imaginary separate linear interpolation was used for both the locally consecutive pilot sub-carriers method and the conventional equally spaced sub-carrier method.

Figure 5B:
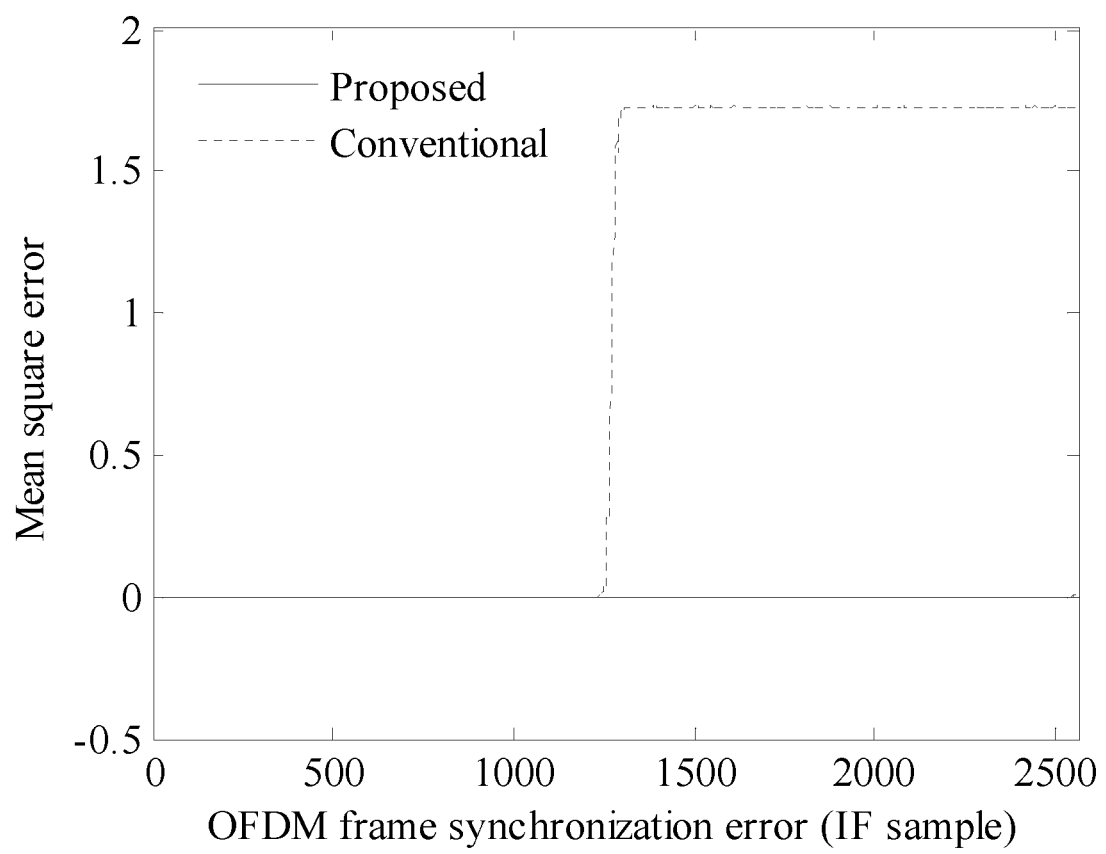
FIG. 5B is an example of a comparison of channel estimation error results using conventional comb-pilot sub-carrier and locally consecutive pilot sub-carrier arrangements.

FIG. 5B shows the results of channel estimation error as a function of OFDM frame timing offset when receiver signal to noise ratio was set to 25 dB. The conventional method has phase ambiguity after the OFDM frame synchronisation delay of N/(2F) equals 1,280 IF samples (i.e. 10,240/(2×4)). In comparison, the locally consecutive pilot sub-carriers method enables accurate channel estimation using linear interpolation over all cyclic prefix length.

Figure 6:
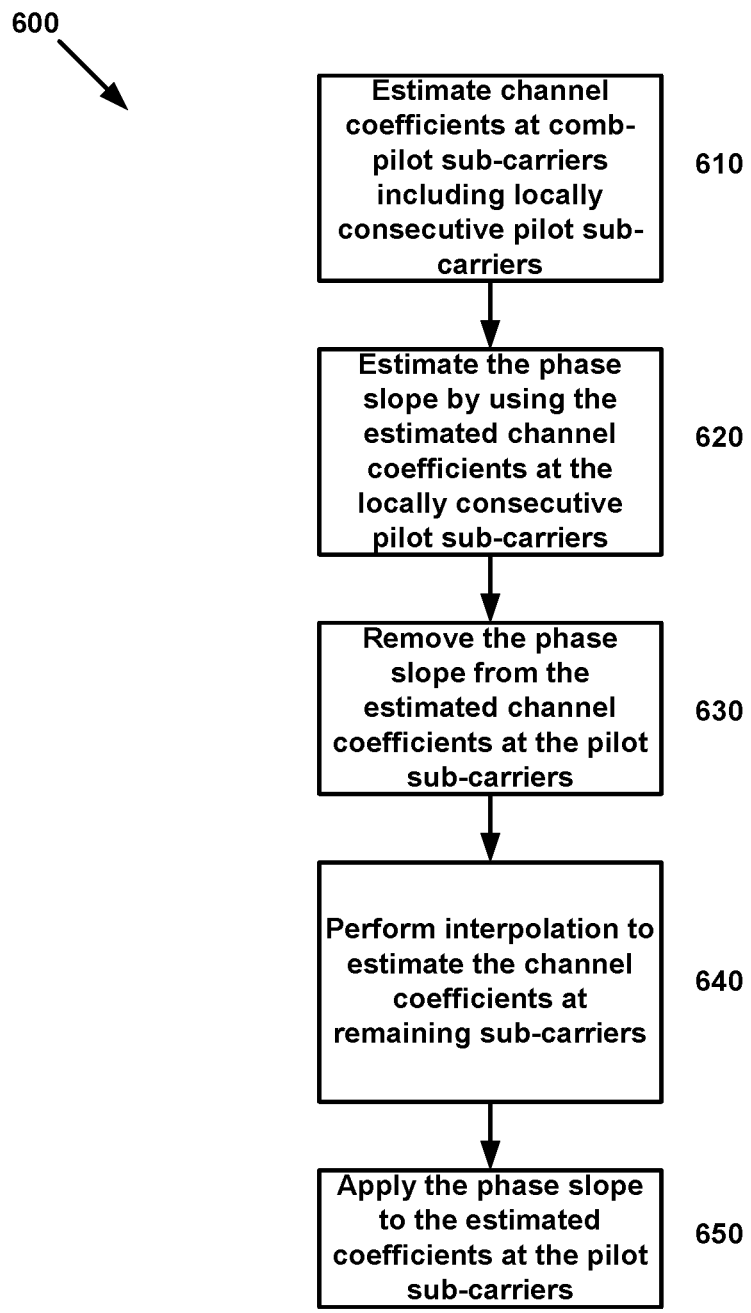
FIG. 6 a flowchart representing an example method utilising locally consecutive sub-carriers for a MU-MIMO OFDM system.

Referring to FIG. 6 there is shown a flowchart representing a method 600 utilising locally consecutive sub-carriers 300 for a MU-MIMO-OFDM system 100.

In particular, the method 600 is described in relation to OFDM frame timing offset. A single-transmitter-single-receiver OFDM link can be described in baseband frequency domain as:

$$R(i_F) = H(i_F)X(i_F)N(i_F) \qquad (1)$$

where $R(i_F)$ is a received symbol, $X(i_F)$ is a transmitted symbol, and $N(i_F)$ is complex Gaussian noise. $i_F=1, 2, \ldots, N_F$ is an OFDM sub-carrier index and N is the total number of OFDM sub-carriers. The complex baseband frequency domain channel coefficient at $i_F$-th OFDM sub-carrier, $H(i_F)$, includes the effect of OFDM frame timing offset which causes linear phase shift as a function of frequency.

$$H(i_F) = G(i_P)\exp(j\theta i_P) \qquad (2)$$

where θ is referred as phase slope in this document.

At step 610, the method 600 includes the receiving device 105 estimating the channel coefficients at comb-pilot sub-carriers including the locally consecutive pilot sub-carriers 300.

In particular, step 610 can be performed by sending a known symbol at comb-pilot sub-carriers and by dividing the received symbol with the known symbol. Assuming $x(i_F)$ is known at the receiving device 105, we have:

$$H_E(1+(i_P-1)F) = \frac{R(1+(i_P-1)F)}{X(1+(i_P-1)F)} \qquad (3)$$

where $i_P=1, 2, \ldots, N_P$, $N_P$ is the total number of comb-pilot sub-carriers, and F is an integer representing the ratio of the number of OFDM sub-carriers over the number of comb-pilot sub-carriers. For simplicity, we assume that the number of OFDM sub-carriers is an integer multiple of the number of comb-pilot sub-carriers 300.

$$F = \frac{N_F}{N_P} \qquad (4)$$

At step 620, the method 600 includes estimating the phase slope by using the estimated channel coefficients at the locally consecutive pilot sub-carriers 300.

In particular, as step 620, the estimation of the phase slope can be calculated as:

$$\theta_E = \frac{\sum_{i_T=1}^{N_T} |H_E(i_S + i_T + 1)||H_E(i_S + i_T)| \angle (H_E(i_S + i_T + 1)H_E^*(i_S + i_T))}{\sum_{i_T=1}^{N_T} |H_E(i_S + i_T + 1)||H_E(i_S + i_T)|} \quad (5)$$

where $i_S$ is an index of sub-carrier one less than the lowest index of the locally consecutive pilot sub-carriers 300, $i_T=1, 2, \ldots, N_T$, and $N_T$ is the number of locally consecutive pilot sub-carriers 300. $N_T$ should be the minimum of 2 and the maximum of any number that implementation can support.

At step 630, the method 600 includes compensating the phase slope for the estimated channel coefficients at pilot sub-carriers to obtain phase slope removed estimated channel coefficients at the pilot sub-carriers.

In particular, step 630 is performed by removing the estimated phase slope from the estimated channel coefficients at the comb-pilot sub-carriers as shown below.

$$G_E(1+(i_P-1)F)=H_E(1+(i_P-1)F)\exp(-j\theta_E[1+(i_P-1)F]) \quad (6)$$

At step 640, the method 600 includes performing interpolation to determine phase slope removed estimated channel coefficients at remaining sub-carriers $P_1$, $P_1$, $P_6$, $R_1$-$R_{15}$ using the phase slope removed estimated channel coefficients (also referred to as compensated estimated channel coefficients).

In particular, step 640 can be performed by simple linear interpolation as shown below.

$$G_E(i_F) = \frac{i_F - 1 - (i_P - 1)F}{F} G_E(1 + i_P F) + \frac{1 - i_F + 1 + (i_P - 1)F}{F} G_E(1 + (i_P - 1)F) \quad (7)$$

where $1+(i_P-1)F \leq i_F < 1+i_P F$.

At step 650, the method 600 includes applying the phase slope to the phase slope removed estimated channel coefficients at the pilot sub-carriers.

In particular, step 650 is mathematically described below.

$$H_E(i_F)=G_E(i_F)\exp(j\theta_E i_F) \quad (8)$$

It will be appreciated that step 650 is optional as will be highlighted in further examples below.

As can be appreciated, multiple groups of locally consecutive pilot sub-carriers 300 can be allocated within one OFDM symbol, in order to enhance the accuracy of the estimation and/or taking advantage of frequency diversity. The above method is based on weighted average of multiple estimated values of phase slope. Other methods, such as simple average or intelligent selection based on amplitudes can be used.

Figure 7A:
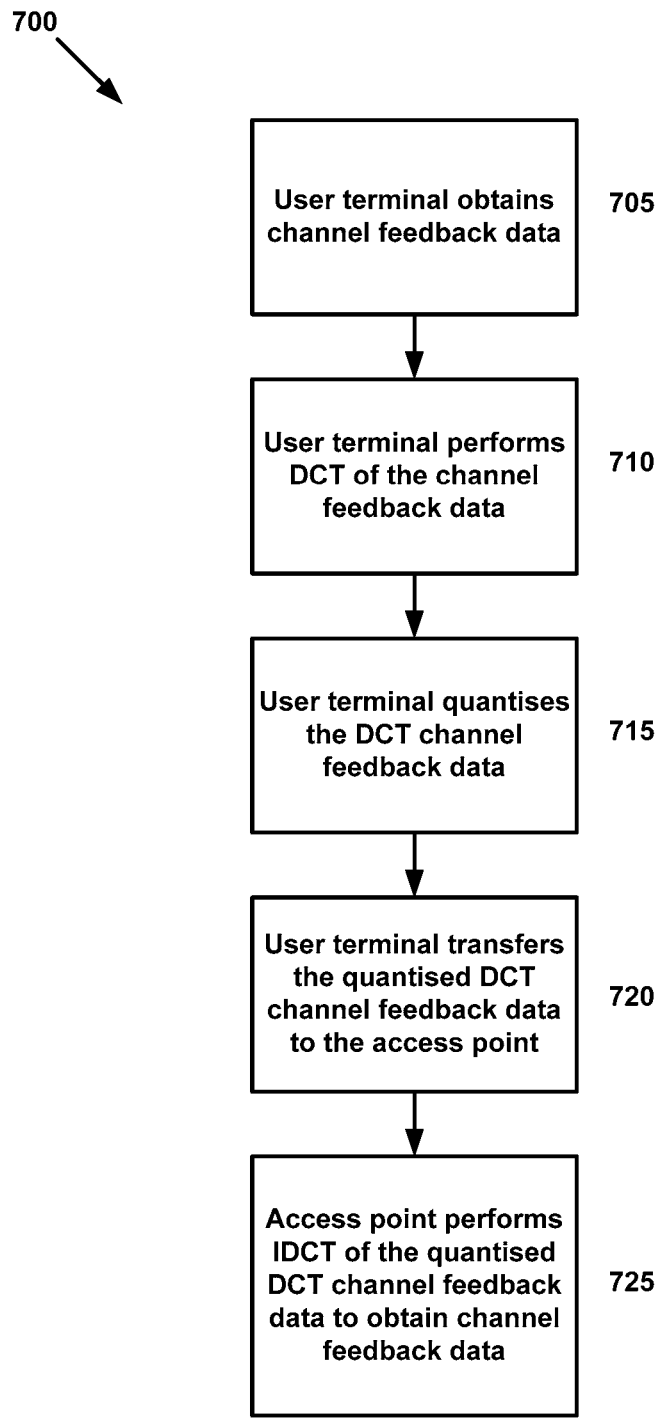
FIGS. 7A and 7B are flow charts representing example methods of using DCT for channel compression for a MU-MIMO OFDM system.

Referring to FIG. 7A there is shown another example method 700 of obtaining channel state feedback in a MU-MIMO-OFDM system 100.

In particular, at step 705, the method 700 includes the user terminal 120 obtaining channel feedback data. At step 710, the method 700 includes the user terminal 120 performing discrete cosine transform (DCT) of the channel feedback data. At step 715, the method 700 includes the user terminal 120 quantising the DCT channel feedback data. At step 720, the method 700 includes the user terminal 120 transferring the quantised DCT channel feedback data to the access point. At step 725, the method 700 includes the access point 110 performing inverse discrete cosine transform (IDCT) of the quantised DCT channel feedback data to obtain channel feedback data. It will be appreciated that the access point 110 can then transfer data wirelessly using the channel feedback data.

By utilising DCT for channel feedback compression for a MU-MIMO-OFDM system 100, substantial efficiency can be achieved over the currently implemented DFT channel feedback compression method, as will be discussed in more detail below.

Figure 7B:
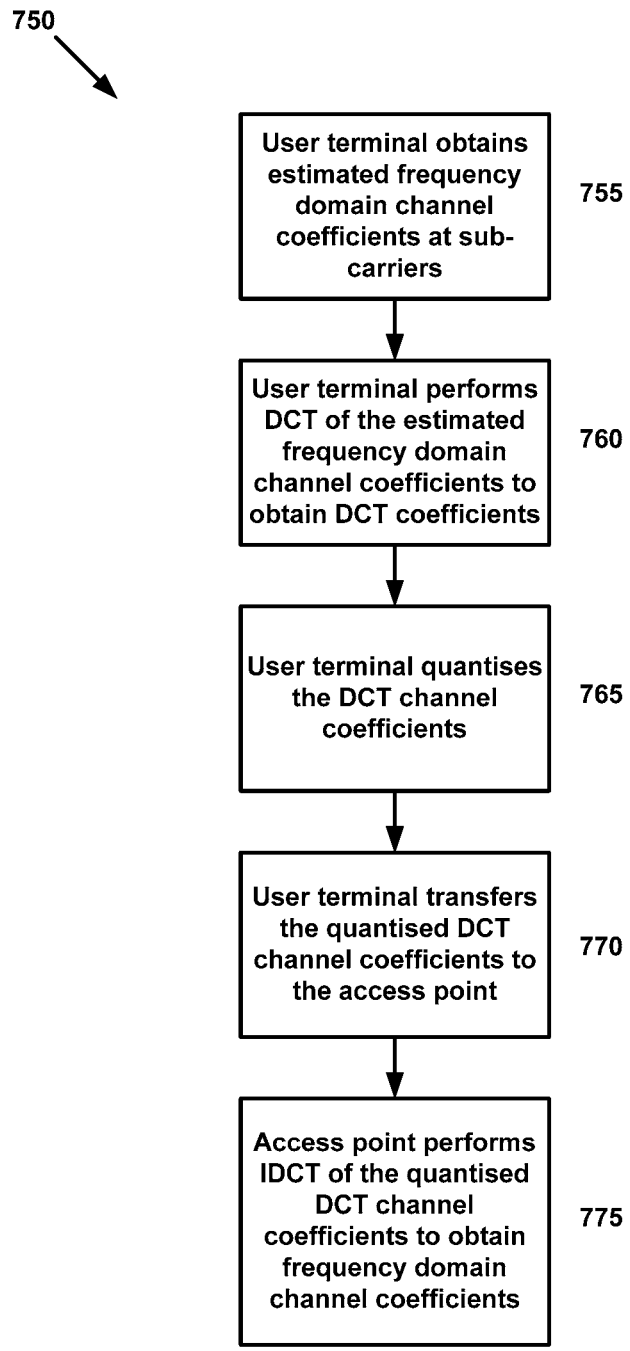

Referring to FIG. 7B there is shown another example method 750 of obtaining channel state feedback in a MU-MIMO-OFDM system 100. The channel state feedback is discussed as being indicative of the channel coefficients that are determined by channel estimation. However, it will be appreciated that the channel state feedback may be indicative of additional information and thus is not only limited to channel coefficients. In one particular embodiment, the channel state feedback can be indicative of channel coefficients determined using the locally consecutive pilot sub-carriers arrangement 300 as discussed above and as will be exemplified later within this document.

At step 755, the method 750 includes a user terminal 120 obtaining estimated frequency domain channel coefficients at sub-carriers including the pilot sub-carriers and the one or more remaining sub-carriers. In particular, this step includes obtaining estimated frequency domain channel coefficients at $i_F$-th sub-carriers, $i_F=1, 2, \ldots, N_F$.

At step 760, the method 750 includes the user terminal 120 performing DCT of the estimated frequency domain channel coefficients to obtain DCT coefficients $d_E$. In particular, this step is performed as:

$$d_{E,Re}(i_D) = w(i_D) \sum_{i_F=1}^{N_F} \mathrm{Re}(H_E(i_F)) \cos\left(\frac{\pi(2i_F - 1)(i_D - 1)}{2N_D}\right) \quad (9)$$

$$d_{E,Im}(i_D) = W(i_D) \sum_{i_F=1}^{N_F} \mathrm{Im}(H(i_F)) \cos\left(\frac{\pi(2i_F - 1)(i_D - 1)}{2N_D}\right) \quad (10)$$

where:

$$w(i_D) = \begin{cases} \frac{1}{\sqrt{N_D}}, & i_D = 1 \\ \sqrt{\frac{2}{N_D}}, & 2 \leq i_D \leq N_D \end{cases}$$

and where:

$i_D$ the DCT coefficient index; and $N_D$ is the total number of DCT coefficients.

At step 765, the method 750 includes the user terminal 120 quantising the DCT channel coefficients. In particular, the quantisation can be performed by uniform scalar quantization on real and imaginary parts of the DCT channel coefficients. DCT channel coefficients associated to the real and imaginary parts of frequency response channel coefficients are quantised independently with $\lfloor B_{NEW}(i_D)/2 \rfloor$ bits, where $B_{NEW}(i_D)$ is obtained, for example, by reverse water filling. The quantised channel coefficients are given as $d_{E,Re,Q}(i_D)$ and $d_{E,Im,Q}(i_D)$.

At step 770, the method 750 includes the user terminal 120 transferring the quantised DCT channel coefficients to the access point 110. In particular, this step is performed by encoding the quantised coefficients as information data and send back from the user terminal 120 to the access point 110. Spectrum efficiency improvement of MU-MIMO-OFDM uplink should be utilised to minimise the time for all required user terminals to send the channel coefficients information back to access point 110. Lossless transmission is assumed in the mathematical descriptions.

At step 775, the method 750 includes the access point 110 performing IDCT of the quantised DCT channel coefficients to obtain frequency domain channel coefficients $H_R$. In particular, this step is performed as:

$$H_{R,Re}(i_F) = \sum_{i_D=1}^{N_D} w(i_D) d_{E,Re,Q}(i_D) \cos\left(\frac{\pi(2i_F-1)(i_D-1)}{2N_D}\right) \quad (11)$$

$$H_{R,Im}(i_F) = \sum_{i_D=1}^{N_D} w(i_D) d_{E,Im,Q}(i_D) \cos\left(\frac{\pi(2i_F-1)(i_D-1)}{2N_D}\right) \quad (12)$$

The complex frequency domain channel coefficients restored at the access point is given by:

$$H_R(i_F) = H_{R,Re}(i_F) + jH_{R,Im}(i_F) \quad (13)$$

Computer simulations have been conducted to compare the performance of DCT based channel compression against DFT based channel compression. The computer simulation was conducted using an OFDM system with 3,456 sub-carriers with sub-carrier spacing of 3.90625 kHz (i.e. 8 MHz/2048). The 3,456 sub-carriers are grouped in 54 groups, termed sub-channels, each having 64 consecutive sub-carriers.

Channel compression was firstly performed for each sub-channel by performing DCT. The channel compression was then performed for each sub-channel by performing DFT, specifically inverse Fast Fourier Transform (IFFT). The simulation was performed by the following steps for DCT:

1) channel frequency response coefficients are estimated by conventional least-square method using known training sequence at 64 consecutive sub-carriers;
2) DCT is performed on the real (or imaginary) values of the channel frequency response coefficients;
3) E largest amplitude coefficients are selected with remaining coefficients being made zeros;
4) E coefficients are quantised with resolution of B bits;
5) IDCT is performed using the quantised coefficients; and
6) original channel frequency response coefficients and restored channel frequency response coefficients are compared to derive the mean square error of the channel feedback.

Here E is the number of effective coefficients and B is the number of bits per effective coefficient (total of 2B bits are used for describing real and imaginary values of one complex coefficient).

The simulation was performed for DFT using the same steps disclosed above for DCT except step 2 was replaced by performing IFFT on the complex channel frequency response coefficients, and step 5 was replaced by performing FFT using the quantised coefficients. The receiver SNR was set to 25 dB as an example for both simulations.

More specifically, modern wireless communication systems, such as LTE and IEEE 802.16m uses orthogonal frequency division multiple access (OFDMA), where different user terminals use different groups of sub-carriers. The group of sub-carriers is called a sub-channel. In this case, the channel state information is fed back to the access point 110 on a sub-channel by sub-channel basis. The comparison is performed using 54 sub-channels, each occupying consecutive 64 sub-carriers, as an example. Channel compression is performed for each sub-channel by performing DCT or DFT (specifically IFFT). In this case, the single-transmitter-single-receiver OFDM link at $i_F$-th sub-carrier in $i_S$th sub-channel is given by:

$$R(i_F, i_S) = H(i_F, i_S) X((i_F, i_S) + N(i_F, i_S) \quad (14)$$

The estimated channel coefficients transformed by DFT for $i_S$th sub-channel for is given by:

$$h_E(i_T, i_S) = \frac{1}{N_{F,FFT}} \sum_{i_F=1}^{N_{F,FFT}} H_E(i_F, i_S) \exp\left(j2\pi\frac{(i_T-1)(i_F-1)}{N_{F,FFT}}\right) \quad (15)$$

The estimated channel coefficients transformed by DCT for $i_S$th sub-channel is similarly defined.

Two types of computer simulation were performed, in particular:

Type 1: The number of channel coefficients to be quantised for conventional and proposed methods, $N_{Q,CON}$ (i.e. conventional DFT) and $N_{Q,NEW}$ (i.e. DCT), respectively, and the number bits for quantisation, $B_{CON}(i_D)$ (i.e. conventional=DFT) and $B_{NEW}(i_D)$ (i.e. DCT), are specified. The remaining channel coefficients are allocated with 0 bit and the access point 110 assumes that the values of those coefficients to be zero.

Type 2: The number of total bits to be used per sub-channel is specified. Bit allocation based on the maximum channel coefficient amplitudes (maximum among different sub-channels) for each coefficient is used.

$$v_{FFT}(i_T) = \max_{i_S=1,2,\ldots,N_S} |h_E(i_T, i_S)| \quad (16)$$

$$v_{DCT}(i_D) = \max\left(\max_{i_S=1,2,\ldots,N_S} |d_{E,Re}(i_D, i_S)|, \max_{i_S=1,2,\ldots,N_S} |d_{E,Im}(i_D, i_S)|\right) \quad (17)$$

The simulation for Type 1 for conventional method was performed by the following steps;

1) channel frequency response coefficients are estimated by conventional least-square method using known training sequence at 64 consecutive sub-carriers, each for 54 sub-channels.
2) IDFT is performed on the 64 complex channel frequency response coefficients, each for 54 sub-channels.
3) $N_{Q,CON}$ largest amplitude coefficients, herein called active coefficients, are selected with remaining coefficients being made zeros.
4) $N_{Q,CON}$ active coefficients are quantised with the resolution of $B_{Q,CON}$ bits per coefficient. (Uniform bit allocation over $N_{Q,CON}$ active coefficients.)
5) DFT is performed using the quantised coefficients.
6) original channel frequency response coefficients and restored channel frequency response coefficients are compared to derive the mean square error of the channel feedback.

The simulation for Type 2 and/or for proposed method was similarly defined. Receiver SNR was set to 25 dB as an example.

Figure 8:
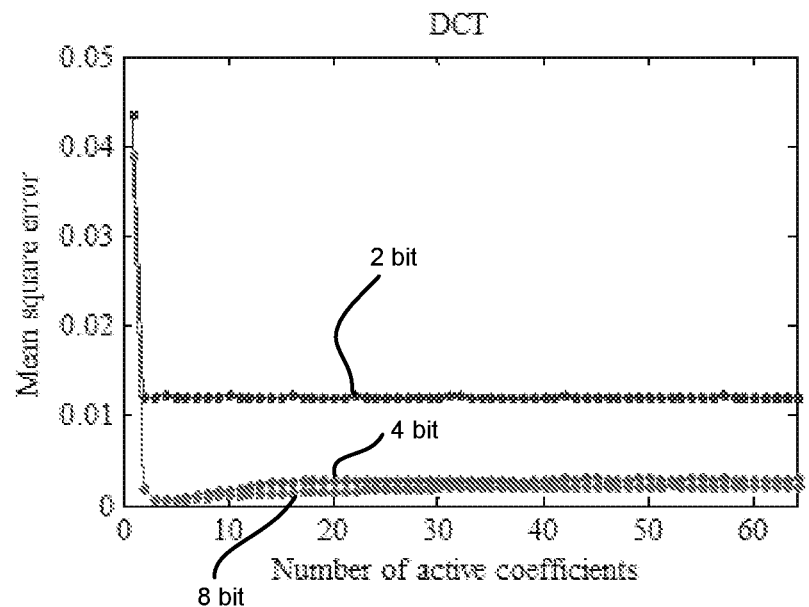
FIG. 8 is graph showing example channel feedback error results using DCT channel compression using uniform bit allocation.
Figure 9:
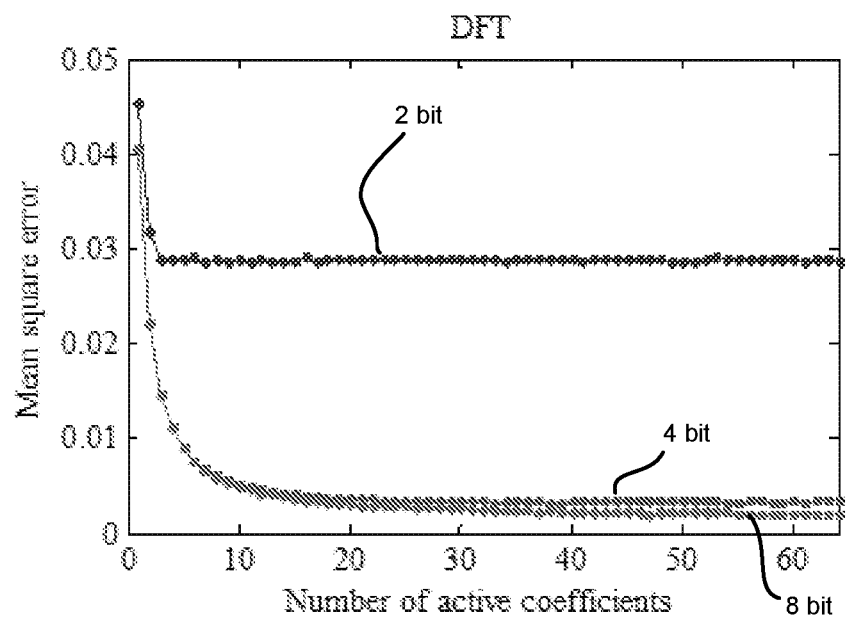
FIG. 9 is a graph showing example channel feedback error results using DFT channel compression, wherein the results are based on uniform bit allocation.

FIGS. 8 and 9 shows example channel feedback error results using DCT and DFT channel compression methods respectively with uniform bit allocation (Type 1). It can be seen that the channel information can be accurately fed-back to access point 110 by using 4 or 8 bit per dimension per coefficients and 5 or 6 coefficients using DCT compression method. The higher index coefficients are dominated by the noise and by removing these, the effects of noise can be reduced. The results do not reach zero error at using all 64 coefficients because of the channel estimation error due to receiver noise (arising from the specified 25 dB SNR).

Figure 10:
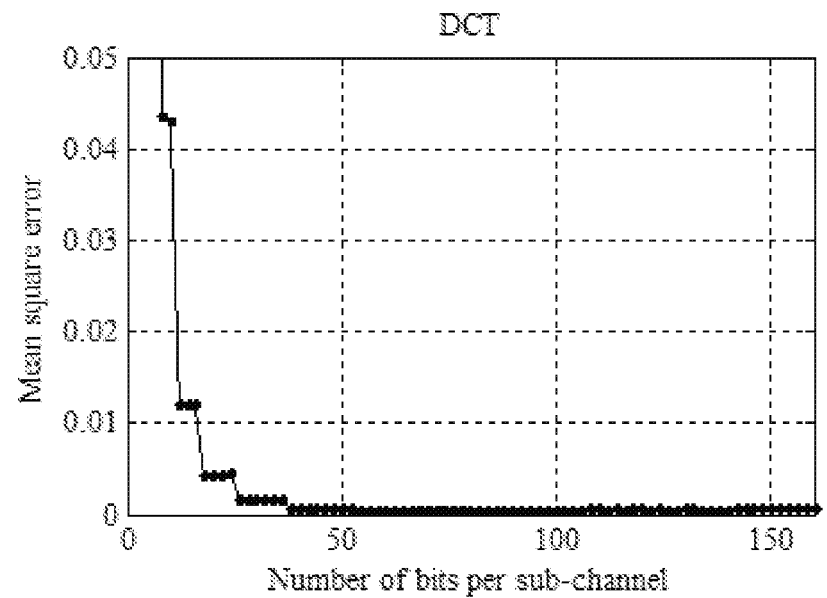
FIG. 10 is graph showing example channel feedback error results using DCT channel compression methods, wherein bit allocation was based on maximum amplitude of coefficients.
Figure 11:
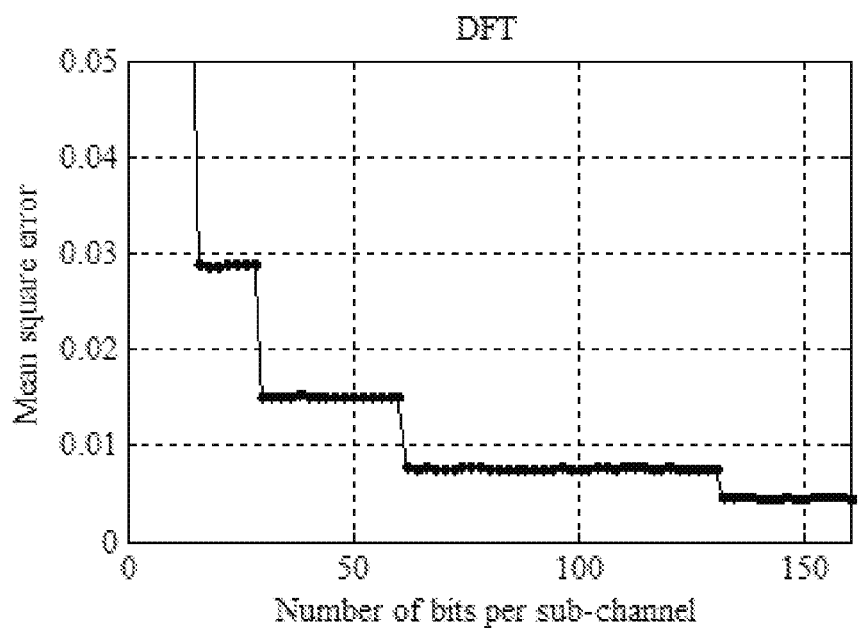
FIG. 11 is graph showing example channel feedback error results using DFT channel compression methods, wherein bit allocation was based on maximum amplitude of coefficients.

Referring to FIGS. 10 and 11 there is shown example channel feedback error results using DCT and DFT channel compression methods respectively and the bit allocation method based on maximum amplitude of coefficients (Type 2 simulation). The results show that approximately only 60 bits are needed for the DCT channel compression to describe an OFDM channel with 64 sub-carriers for the given channel characteristics and sub-carrier spacing.

FIGS. 8 and 10 clearly show the advantage of DCT based channel feedback as discussed above when compared to FIGS. 9 and 11 which use DFT based channel feedback. DCT based channel feedback can lead to significant efficiency for an MU-MIMO-OFDM system 100 can be achieved.

The efficiency achieved via use of DCT has been found to be extremely surprising, particularly in relation to the area of wireless communication. This is due to the fact that the channel frequency response and time domain impulse response are directly related to each other by the DFT, while the physical concept of performing DCT (or other variants thereof) on frequency response does not appear to have a direct bearing or physical meaning. Nevertheless, the use of DCT for the purpose of channel compression has been surprisingly found to outperform that of the DFT based channel compression as previously accepted in industry, which can therefore provide a more efficient MU-MIMO-OFDM system 100.

It will be appreciated from the above example that whilst DCT compression can be used for compressing estimated channel coefficients, it is possible to advantageously utilise DCT compression in relation to phase slope removed estimated channel coefficients as discussed in relation to FIGS. 2 to 6 where quantised DCT channel coefficients indicative of phase slope removed estimated channel coefficients are transferred from the user terminal 120 to the access point 110 for downlink signal processing. In particular, step 705 of method 700 includes obtaining the channel feedback data which includes the user terminal 120 obtaining the phase slope removed estimated downlink channel coefficients as discussed in relation to method 400 or steps 610 to 640 of method 600. Steps 710 to 720 are performed as discussed above. At step 725, the method 700 includes the access point 110 performing the inverse discrete cosine transform (IDCT) of the quantised DCT channel feedback data to obtain the channel feedback data, wherein the channel feedback data is indicative of the phase slope removed estimated channel coefficients.

Figure 12:
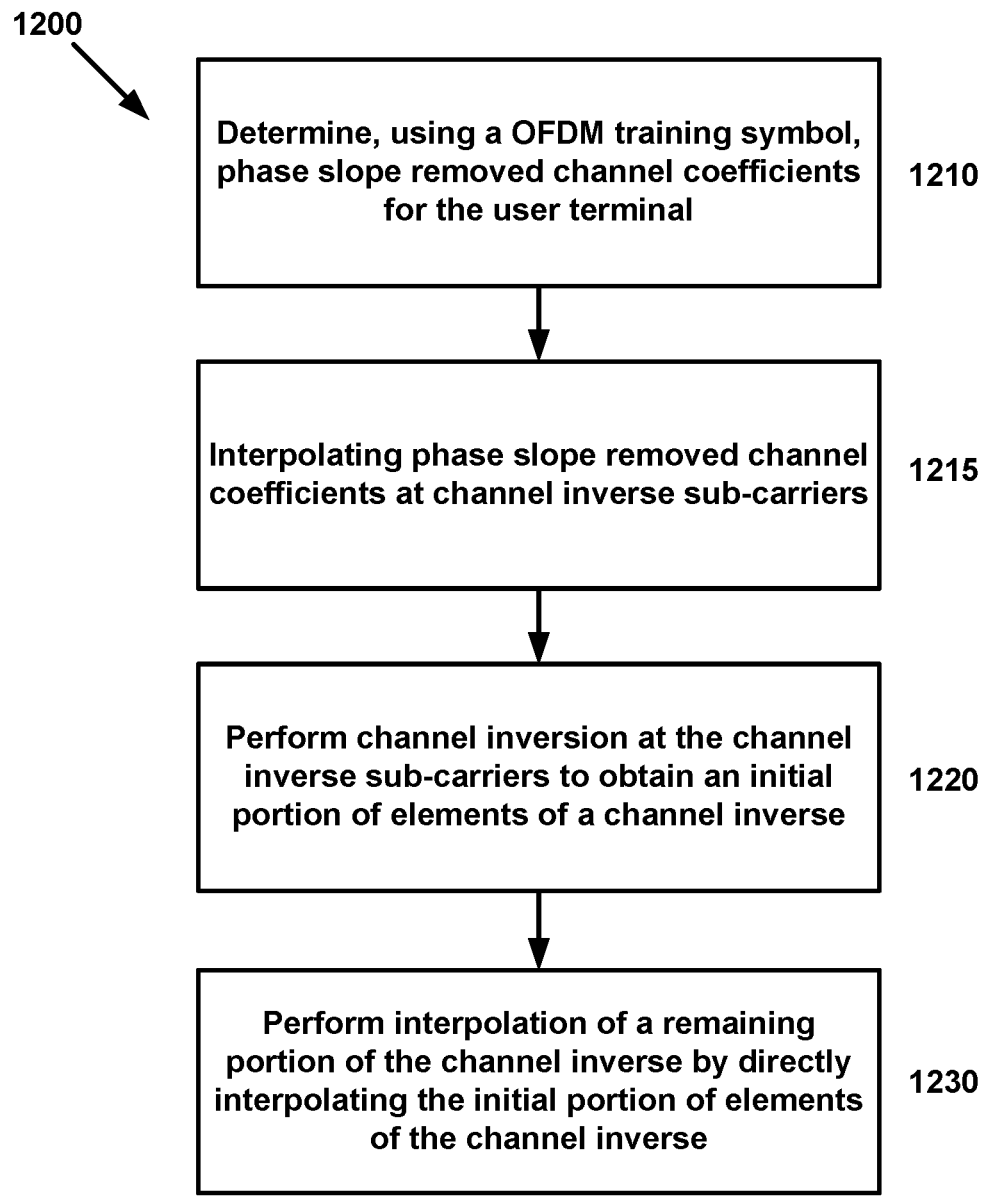
FIG. 12 is a flowchart representing an example method performed by an access point of a MU-MIMO-OFDM system for uplink signal processing.
Figure 13:
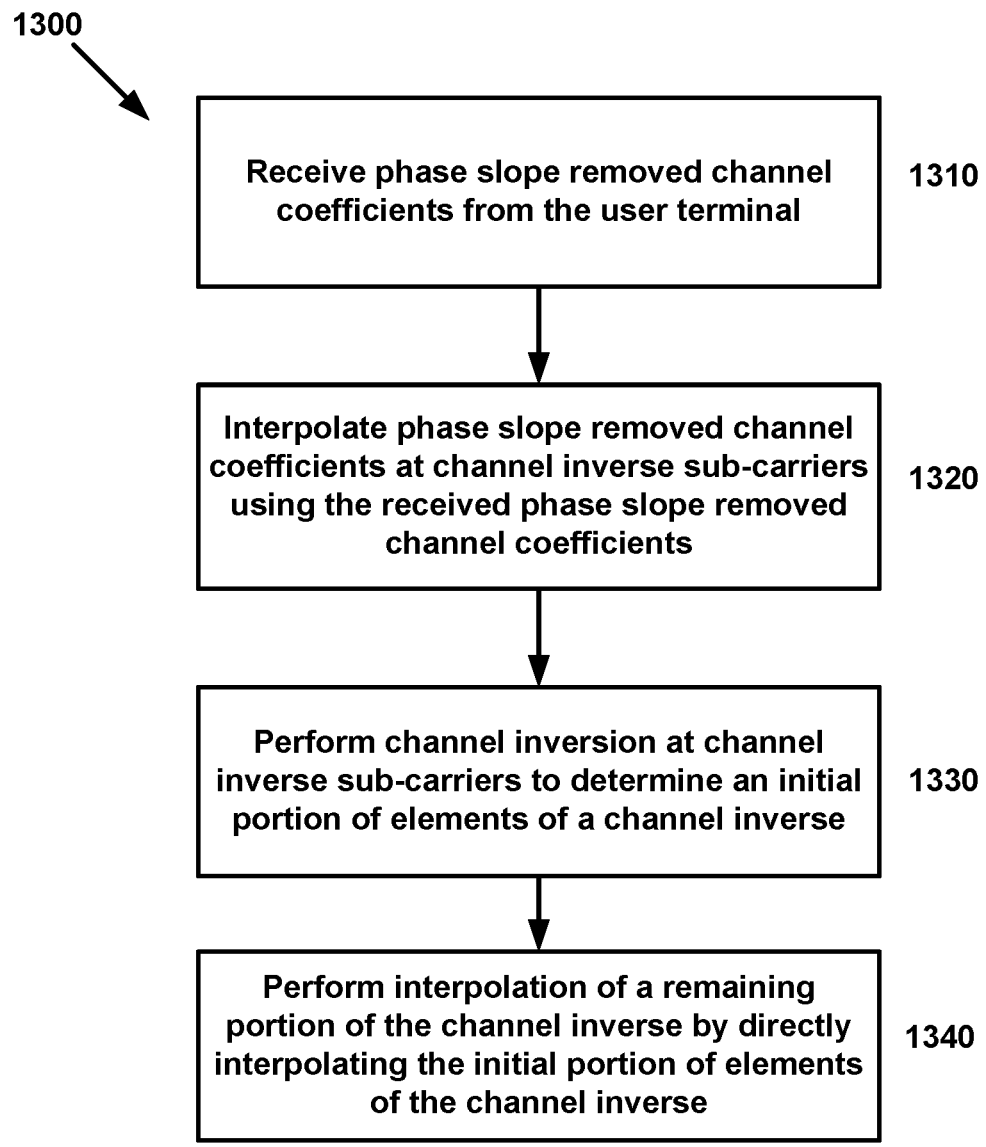
FIG. 13 is a flowchart representing an example method performed by an access point of a MU-MIMO-OFDM system for downlink signal processing.

FIGS. 12 and 13 disclose methods to interpolate elements of a channel inverse directly. Before constructing the channel inverse at selected pilot sub-carriers (referred to as channel inverse sub-carriers 1400), the user specific phase slope due to OFDM frame timing offset is removed. This is applicable to both uplink and downlink signal processing. Interpolation of the channel inverse is performed on the phase slope compensated channel inverse. For the uplink, the phase slope is restored after user symbols are extracted by the zero-forcing operation. For downlink, phase slope is restored by having pre-coded reference symbol, typically preceding the pre-coded data symbols.

Referring to FIG. 12 there is shown a method 1200 performed by an access point 110 of a MU-MIMO-OFDM system 100 for uplink signal processing. In particular, at step 1210, the method includes the access point 110 determining, using a OFDM training symbol received from a user terminal 120, phase slope removed estimated channel coefficients for the user terminal 120.

At step 1215, the method 1200 includes the access point 110 interpolating phase slope removed estimated channel coefficients at channel inverse sub-carriers. The channel inverse sub-carriers 1400 (see FIG. 14) are common sub-carriers at which the estimated channel coefficients are determined by the interpolation for all user terminals 120 of the multi-user OFDM MIMO system 100.

At step 1220, the method 1200 includes the access point 110 performing channel inversion using the phase slope removed estimated channel coefficients at the channel inverse sub-carriers 1400 (see FIG. 14) to obtain an initial portion of elements of the channel inverse.

At step 1230, the method 1200 includes the access point 110 performing interpolation of remaining elements of the channel inverse by directly interpolating the initial elements of the channel inverse. Transmitted symbols can be reconstructed by the access point 110 from OFDM data symbols received from the user terminal 120 using the interpolated channel inverse and applying the specific phase slope for the user terminal 120.

Referring to FIG. 13 there is shown a method 1300 performed by an access point 110 of a MU-MIMO-OFDM system 100 for downlink signal processing. At step 1310, the method 1300 includes the access point 110 receiving estimated channel coefficients from a user terminal 110, wherein an estimated phase slope has been removed. Therefore, it will be appreciated that the received estimated channel coefficients are phase slope removed estimated channel coefficients.

At step 1320, the method 1300 includes the access point 110 interpolating phase slope removed estimated channel coefficients at channel inverse sub-carriers using the phase slope removed estimated channel coefficients received from the user terminal 120. The channel inverse sub-carriers 1400 (see FIG. 14) are common sub-carriers at which the estimated channel coefficients are to be determined by interpolation for all user terminals 110 of the multi-user OFDM MIMO system 100.

At step 1330, the method 1300 includes the access point 110 performing channel inversion using the phase slope removed estimated channel coefficients at channel inverse sub-carriers 1400 (see FIG. 14) to determine an initial portion of a channel inverse.

At step 1340, the method 1300 includes the access point 110 performing interpolation of a remaining portion of elements of the channel inverse by directly interpolating the initial elements of the channel inverse. OFDM training symbols transmitted from the access point 110 to each user terminal 120 can be pre-coded by the channel inverse to allow the user terminal to estimate a pre-coded channel estimate. OFDM data symbols transmitted from the access point to each user terminal are pre-coded by the channel inverse such that each user terminal can perform zero-forcing detection using the estimated pre-coded channel estimate.

It will be appreciated that phase slope removed estimated channel coefficients received at step 1310 can be received from the user terminal 120 performing method 400 or steps 610 to 640 of method 600 as discussed above.

Figure 14:
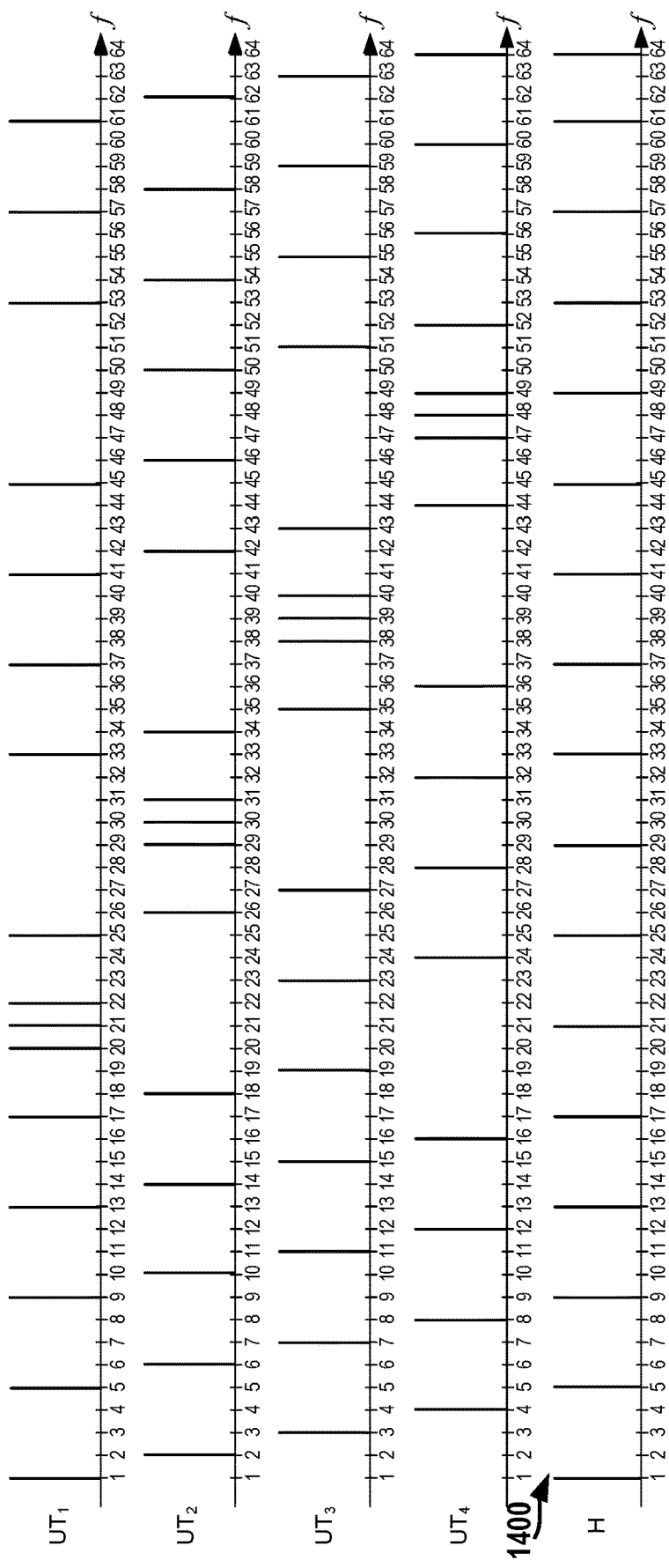
FIG. 14 is an example of a uplink comb-pilot sub-carrier arrangement with locally consecutive pilot sub-carriers.

A method of uplink signal processing will now be described in relation to an example of a comb-pilot sub-carrier arrangement with locally consecutive pilot sub-carriers 300 as shown in FIG. 14. In particular, in this embodiment, the uplink packet from the user terminal includes channel training OFDM symbols and data symbols. The channel training symbols are specifically used for estimation of the uplink channel. This is commonly known as block type channel training. It will be appreciated that this channel inverse interpolation method is equally applicable to comb type channel training where one OFDM symbol contains both the channel training sub-carrier symbols and data sub-carrier symbols.

Referring more specifically to FIG. 14 the comb-pilot sub-carrier arrangement with locally consecutive pilot sub-carriers 300 is for four user terminals 110 using the total of 64 OFDM sub-carriers. This type of arrangement is referred as FDMA channel training since different user terminals 110 are distinguished by using different sub-carrier frequencies. Channel training sub-carrier symbols are sent at sub-carrier indices of 1, 5, 9, 13, 17, 20, 21, 22, 25, 33, 37, 41, 45, 53, 57, and 61 in the case of UT1, and so on. In particular, each user terminal 110 occupies 16 sub-carriers with the interpolation factor of 64/16=4. The number of user terminals can be extended by using a larger interpolation factor and/or combining CDMA channel training.

Channel coefficients are estimated at each comb-pilot sub-carrier location by known conventional pilot-aided channel estimation techniques, such as least square error method. Once the estimated channel coefficients are determined at locally consecutive pilot sub-carriers 300, phase slope can be estimated for each user terminal, as discussed above. For example, the phase slope for user terminal $UT_1$ should be estimated by using the channel estimates at locally consecutive pilot sub-carriers 20, 21, and 22.

Once the phase slope is removed from the estimated channel coefficient values, interpolation can be performed to obtain the estimates of the channel coefficient at sub-carriers common to all user terminals 120. These common sub-carriers at which the channel coefficients are to be estimated by the interpolation for all user terminals 120 are referred to as the channel inverse sub-carriers 1400. An example of the selection of the channel inverse sub-carriers 1400 is shown in FIG. 14. In this case, sub-carrier indices 1, 5, 9, 13, 17, 21, 25, 29, 33, 37, 41, 45, 49, 53, 57, 61, and 64 are selected as the channel inverse sub-carriers 1400. Sub-carrier indices 1 to 61 have uniform interval of 4. Sub-carrier index 64 is also selected to remove errors due to extrapolation of channel inverse.

Channel inversion is then performed at the channel inverse sub-carriers. The channel inversion obtains an initial portion of elements of the channel inverse. Conventional channel inversion algorithms can be used to obtain the inverse of the estimated channel matrix at the channel inverse sub-carriers.

Different from conventional methods, a remaining portion of elements of the channel inverse at remaining sub-carriers (2, 3, 4, 6, 7, 8, 10, 11, 12, 14, 15, 16, 18, 19, 20, 22, 23, 24, 26, 27, 28, 30 31, 32, 34, 45, 46, 38, 39, 40, 42, 43, 44, 46, 47, 48, 50, 51, 52, 54, 55, 56, 58, 59, 60, 62, and 63) are obtained by direct interpolation of the initial portion of elements of the channel inverse. Conventional interpolation methods such as linear, polar linear, polynomial, spline, etc. can be used. It will be appreciated that the remaining portion of elements of the channel inverse together with the initial portion of elements of the channel inverse provide or form the channel inverse.

Figure 15:
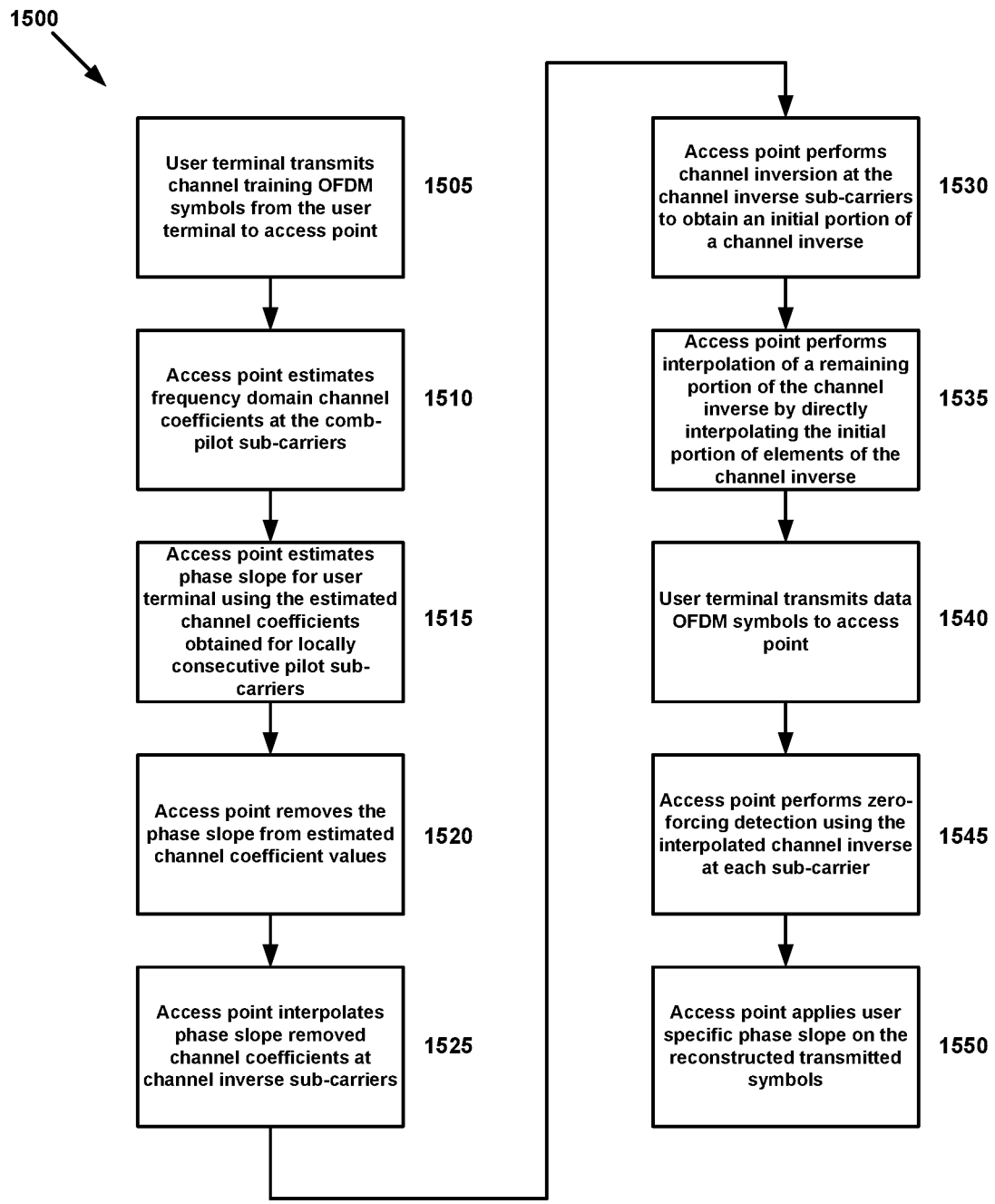
FIG. 15 is a flowchart representing an example method of estimating channel coefficients and calculating the channel inversion for a MU-MIMO-OFDM system based on the example uplink comb-pilot sub-carrier arrangement of FIG. 14.

Referring to FIG. 15 there is shown a flowchart representing an example method of uplink signal processing including estimating channel coefficients and calculating the channel inversion for a MU-MIMO-OFDM system 100. The method 1500 will be described with reference to the comb-pilot sub-carrier arrangement with locally consecutive pilot sub-carriers 300 described in relation to FIG. 14.

In particular, at step 1505, the method 1500 includes each user terminal 120 transmitting channel training OFDM symbols to the access point 110.

At step 1510, the method 1500 includes the access point 110 estimating frequency domain uplink channel coefficients at the comb-pilot sub-carriers including locally consecutive pilot sub-carriers 300. For example, the frequency domain uplink channel coefficients can be estimated by a conventional pilot-aided channel estimation method at sub-carrier indices of 1, 5, 9, 13, 17, 20, 21, 22, 25, 33, 37, 41, 45, 53, 57, and 61 for user terminal UT1. Channels between all active user terminal transmitters and access point receivers can be estimated.

At step 1515, the method 1500 includes the access point 110 estimating the phase slope for each user terminal 120 of the multi-user OFDM MIMO system 100 using the uplink estimated channel coefficients obtained for the locally consecutive pilot sub-carriers 300. In this example, the phase slope can be estimated by using the uplink estimated channel coefficient values at sub-carrier indices of 20, 21, and 22 for user terminal UT1. The phase slope can be estimated for each user terminal 120 for each sub-channel. When one user terminal 120 occupies multiple sub-channels, the estimated phase slope values for different sub-channels occupied by the user terminal 120 may be utilised to obtain a single phase slope estimation value for the user terminal 120 by, for example, weighted average.

At step 1520, the method 1500 includes the access point 110 removing the phase slope from the uplink estimated channel coefficient values at the pilot sub-carriers to obtain phase slope removed uplink estimated channel coefficients.

At step 1525, the method 1500 includes the access point 110 interpolating phase slope removed uplink estimated channel coefficients at channel inverse sub-carriers using the phase slope removed uplink channel estimated coefficients at the pilot sub-carriers. A conventional interpolation method can be used such as linear, polar linear, polynomial, or spline interpolation methods.

At step 1530, the method 1500 includes the access point 110 performing channel inversion at the channel inverse sub-carriers 1400 using the phase slope removed estimated channel coefficients at the channel inverse sub-carriers. A conventional channel inversion algorithm can be used. The channel inversion in this step obtains an initial portion of elements of the channel inverse.

At step 1535, the method 1500 includes the access point 110 performing interpolation of a remaining portions of elements of the channel inverse by using the initial portion of elements of the channel inverse by a conventional interpolation method such as linear, polar linear, polynomial, or spline interpolation.

At step 1540, the method 1500 includes one or more user terminals 120 transmitting data OFDM symbols to the access point 110.

At step 1545, the method 1500 includes the access point 110 performing zero-forcing detection using the interpolated channel inverse at each sub-carrier of the respective user terminal(s) 120.

At step 1550, the method 1500 includes the access point 110 applying the user terminal specific phase slope on the reconstructed transmitted symbols for the respective user terminal(s) 120.

A method of downlink signal processing will now be described in relation to FIG. 16 which shows an example downlink comb-pilot sub-carrier arrangement 200 including a locally consecutive pilot sub-carrier arrangement 300 for four access point antennas. The same sub-channel and sub-carrier arrangement with the previous example of the uplink discussed in relation to FIGS. 14 and 15, and in particular, 54 sub-channels, each supporting 64 OFDM sub-carriers, with the total of 3,456 OFDM sub-carriers are defined.

Different from the uplink channel training arrangement discussed in relation to FIG. 14 where the locally consecutive pilot sub-carriers 300 are defined for each sub-channel, only one group of locally consecutive pilot sub-carriers 300 is needed for the entire frequency bandwidth, since all OFDM sub-carriers are generated from the access point 110.

Figure 16:
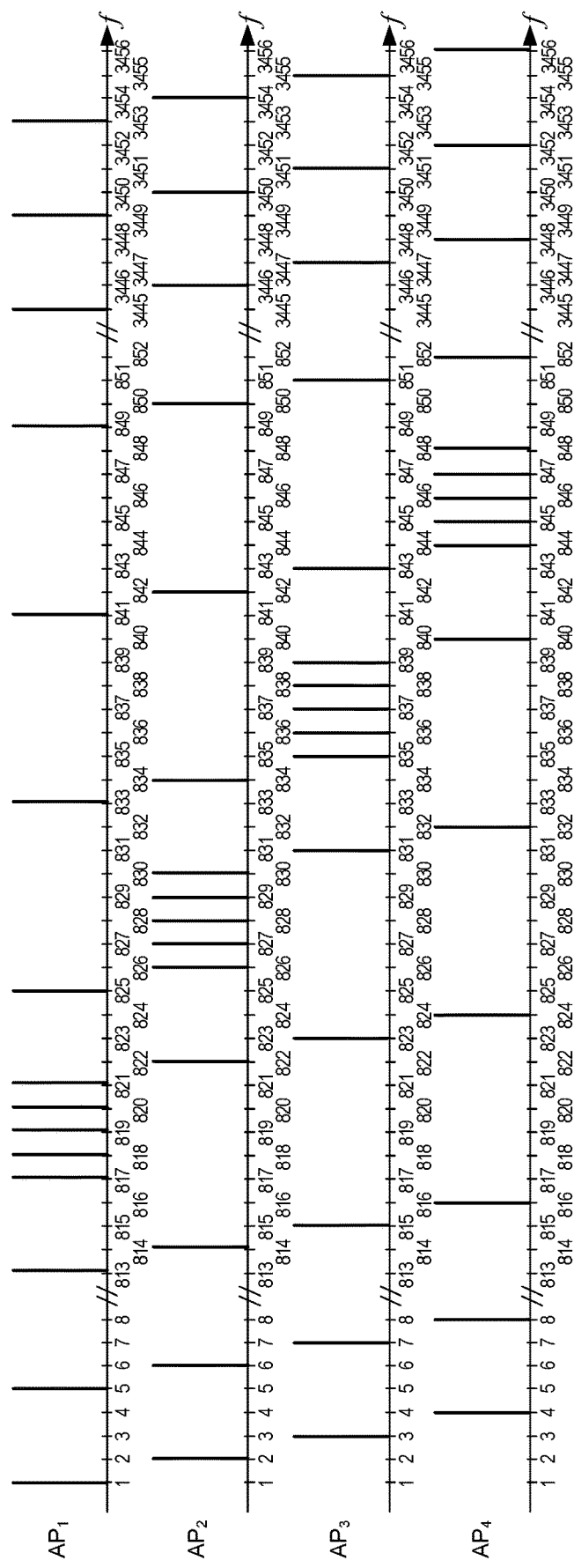
FIG. 16 is an example of a downlink comb-pilot sub-carrier arrangement with locally consecutive pilot sub-carriers.

In the example shown in FIG. 16, sub-carrier indices 817 to 821 are allocated as locally consecutive pilot-sub-carriers for access point antenna AP1, and so on. Another group of locally consecutive pilot sub-carriers 300 can be defined, for example, from 2605 to 2636 (pilot arrangement from 2605 to 2636 are the same as that of 813 to 848), to take advantage of frequency diversity.

Figure 17:
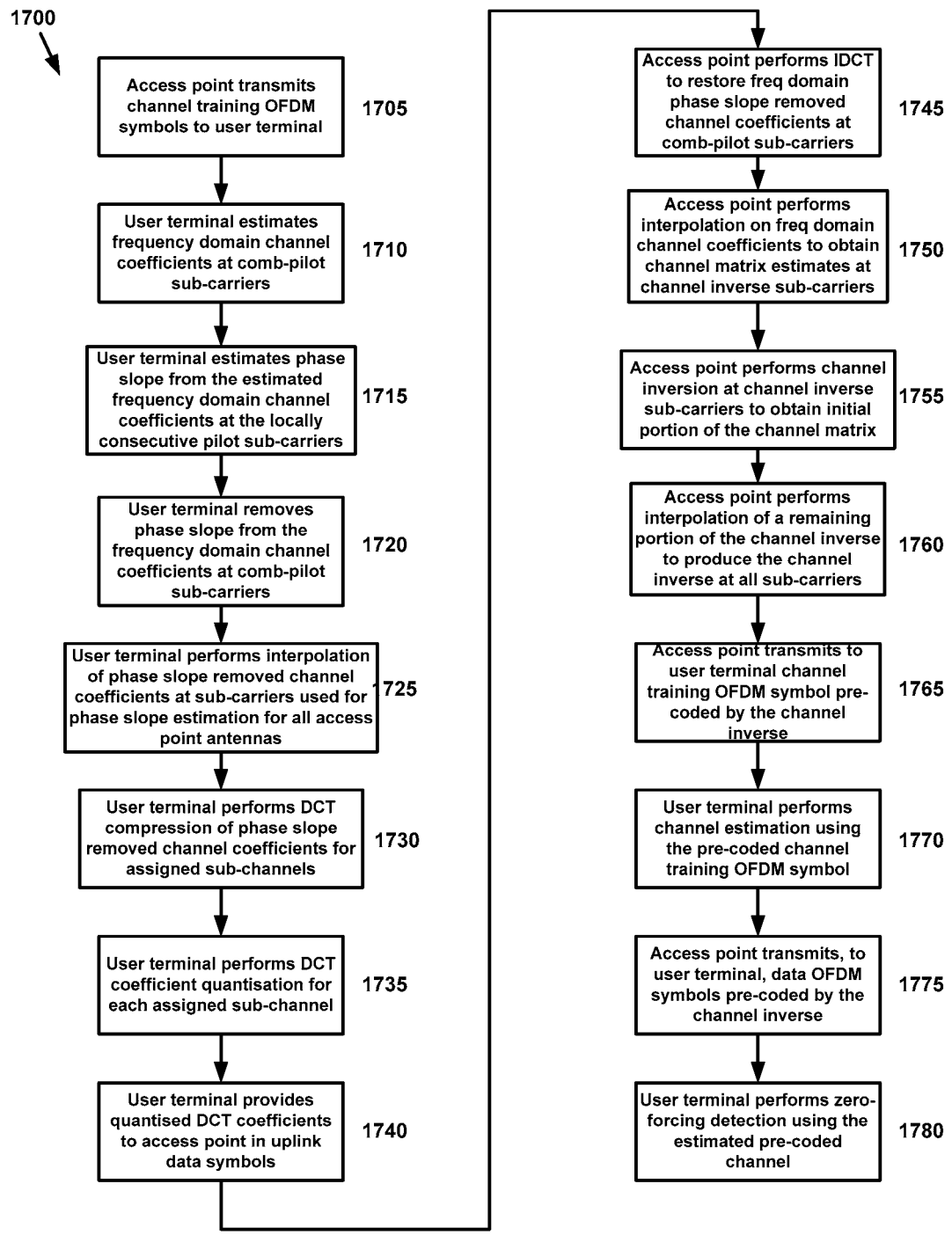
FIG. 17 is a flowchart representing an example method of estimating channel coefficients, compressing the estimate channel coefficients using DCT and calculating the channel inversion for a MU-MIMO-OFDM system based on the example downlink comb-pilot sub-carrier arrangement of FIG. 16.

Referring to FIG. 17 there is shown a flowchart representing an example method of downlink signal processing including estimating channel coefficients, compressing the estimate channel coefficients using DCT and calculating a part of the channel inverse using interpolation for a MU-MIMO-OFDM system 100. The method 1700 will be described with reference to the downlink comb-pilot sub-carrier arrangement 200 including the locally consecutive pilot sub-carrier arrangement 300 discussed in relation to FIG. 16.

In particular, at step 1705, the method 1700 includes the access point 110 transmitting channel training OFDM symbols to each user terminal of the of the multi-user OFDM MIMO system 100. The channel training OFDM symbols include comb-pilot sub-carriers 200 which include locally consecutive pilot sub-carriers 300 as discussed in previous examples. In addition, the channel training OFDM symbols may be extended with orthogonal codes to combine CDMA channel training. In the example, interpolation factor of 4 with Walsh code of length 8 are used to differentiate 32 AP transmitters.

At step 1710, the method 1700 includes each user terminal 120 estimating frequency domain downlink channel coefficients at comb-pilot sub-carriers 200 and the one or more remaining sub-carriers $R_1$-$R_{15}$. The channel estimation should be made at least at the sub-channels that are assigned to the respective user terminal 120 including the locally consecutive pilot sub-carriers 300.

At step 1715, the method 1700 includes each user terminal 120 estimating a phase slope from the estimated frequency domain downlink channel coefficients at the locally consecutive pilot sub-carriers 300. Only one phase slope estimate representative of the all access point antennas 112 needs to be determined for each user terminal 120. The representative phase slope value may be derived, for example, by weighted average of phase slope estimates corresponding to a different access point antenna 112.

At step 1720, the method 1700 includes each user terminal 120 removing the phase slope from the estimated frequency domain downlink channel coefficients at comb-pilot sub-carriers 200 for all access point antennas. This step results in each user terminal 120 obtaining phase slope removed channel coefficients at the comb-pilot sub-carriers 200.

At step 1725, the method 1700 includes each user terminal 120 performing interpolation of phase slope removed downlink estimated channel coefficients at sub-carriers (herein referred to as the DCT sub-carriers) used for phase slope estimation for all access point antennas 112 to compensate the channel estimates. The DCT sub-carriers can include one or more pilot sub-carriers and one or more remaining sub-carriers. Interpolating phase slope removed channel coefficients at the DCT sub-carriers is performed to provide uniformity in order to allow for the DCT compression to be performed in later steps. A conventional interpolation method such as linear, polar linear, polynomial, etc. can be used. In the example discussed in relation to FIG. 16, the channel coefficients for access point antenna AP1 should be derived by interpolation at 829, 837, and 845 (and at 2,621, 2,629, and 2,637, if another group of locally consecutive pilot sub-carriers 300 are defined from 2605 to 2636). This will result in an estimated channel coefficient value every 4th sub-carrier for all access point antennas 112.

At step 1730, the method 1700 includes each user terminal 120, for sub-channels assigned to the respective user terminal 120, performing DCT compression to produce a reduced number of DCT coefficients, each for real and imaginary component. In this example, each of 54 sub-channels has 64 sub-carriers, resulting in the total of 3,456 sub-carriers. Each sub-channel has the total of 16 comb-pilot sub-carriers 200. DCT is performed twice, firstly on 16 real components of the phase slope removed estimated channel coefficients and then secondly on 16 imaginary components of the phase slope removed channel coefficients. Only the first six DCT coefficients are retained. The 7th to 16th coefficients are regarded as zeros.

At step 1735, the method 1700 includes each user terminal 120 performing DCT coefficient quantisation for each sub-channel assigned to the respective user terminal. Normalisation is performed once for all $N_{SC}(i_{UT}) \times 6 \times 2$ DCT coefficients so that quantisation does not cause clipping while maximising the dynamic range of the quantisation, where $N_{SC}(i_{UT})$ is the number of sub-channel allocated to $i_{UT}$th user terminal 120. An example quantisation, which uses 44 bits for real components and 44 bits for imaginary components per sub-channel, is performed as follows:

a. 1st DCT coefficient, real or imaginary: 12 bits signed 2's complement
    b. 2nd DCT coefficient, real or imaginary: divide by 2, and then allocate 9 bits of 2's complement
    c. 3rd DCT coefficient, real or imaginary: divide by 2, and then allocate 8 bits of 2's complement
    d. 4th DCT coefficient, real or imaginary: divide by 4, and then allocate 6 bits of 2's complement.
    e. 5th DCT coefficient, real or imaginary: divide by 4, and then allocate 4 bits of 2's complement.
    f. 6th DCT coefficient, real or imaginary: divide by 8, and then allocate 4 bits of 2's complement.

At step 1740, the method 1700 includes transferring quantised DCT coefficients from each user terminal 120 to the access point 110 by embedding these in uplink data symbols. Feedback includes only the DCT coefficients associated to the sub-channel assigned to the respective user terminal 120.

At step 1745, the method 1700 includes the access point 110, for each sub-channel, and for each active user terminal 120 assigned to the sub-channel, performing IDCT to restore the frequency domain phase slope removed downlink estimated channel coefficients for each of access point antennas 112 at the comb-pilot sub-carriers 200.

At step 1750, the method 1700 includes the access point 110 performing interpolation on frequency domain phase slope removed downlink estimated channel coefficients to obtain channel matrix estimates at channel inverse sub-carriers. A conventional interpolation/extrapolation method can be used.

At step 1755, the method includes the access point 110 performing channel inversion at channel inverse sub-carriers using the phase slope removed downlink estimated channel coefficients at the channel inverse sub-carriers to obtain an initial portion of elements of the channel inverse. A conventional matrix inversion algorithm can be used.

At step 1760, the method includes the access point 110 performing interpolation of a remaining portion of elements of the channel inverse using the initial portion of elements of the channel inverse, such that the initial portion and the remaining portion of the channel inverse produce the channel inverse at all sub-carriers. A conventional interpolation method can be used.

At step 1765, the method 1700 includes the access point 110 transmitting, to each user terminal 120, channel training OFDM symbol pre-coded by the channel inverse. The channel training OFDM symbol can be a conventional channel training symbols using all OFDM sub-carriers.

At step 1770, the method 1700 includes each user terminal 120 performing channel estimation using the pre-coded channel training OFDM symbol. A conventional pilot-aided channel estimation method can be used. The estimated channel using the pre-coded channel training OFDM symbol is referred to as an estimated pre-coded channel.

At step 1775, the method 1700 includes the access point 110 transmitting, to one or more user terminals, OFDM data symbols pre-coded by the channel inverse.

At step 1780, the method includes each respective user terminal 120 which received the OFDM data symbols, performing zero-forcing detection (single coefficient at each sub-carrier) using the estimated pre-coded channel.

Figure 18:
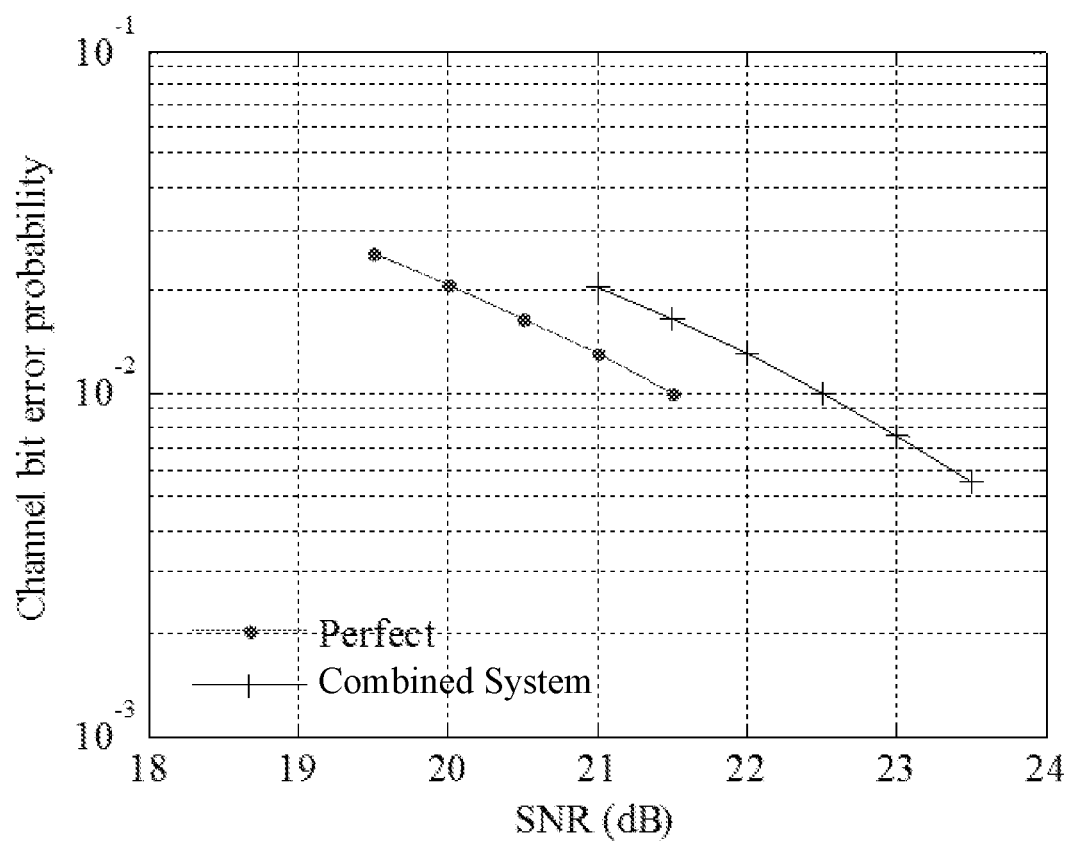
FIG. 18 is a graph indicative of results of a simulation of a MU-MIMO-OFDM downlink of a MU-MIMO-OFDM system.

Referring to FIG. 18 there is shown results of a simulation of a MU-MIMO-OFDM downlink of a MU-MIMO-OFDM system 100 wherein the above mentioned methods of estimating channel coefficients, compressing the estimate channel coefficients using DCT and calculating part of the channel inverse using interpolation for a MU-MIMO-OFDM system were utilised in combination.

In particular, the simulation was performed using the following parameters of the MU-MIMO-OFDM system 100:
- 32 access point transmitters/antennas, 16 user terminal receivers.
- 3,456 OFDM sub-carriers with 8 MHz/2048=3.90625 kHz sub-carrier spacing.
- 54 sub-channels each with 64 OFDM sub-carriers.
- Each user terminal is allocated with the full 54 sub-channels.
- Channel training pilot sub-carriers 200 as defined above using two sets of locally consecutive pilot sub-carriers 300. The channel training symbols are extended by Walsh code with length 8 to support 32 access point transmitters. (Channel estimation requires 8 channel training OFDM symbols.)
- DCT compression is performed for each sub-channel, using 6 real and 6 imaginary coefficients with the bit allocation. Total number of bits per user to be feedback for 32 access point transmitters and 54 sub-channels is 44×2×54×32=152,064 bits. This amounts to 9 data OFDM symbols for channel feedback, if 64QAM and ⅚ FEC (Forward Error Correction) are used, and to 22 data OFDM symbols if 16QAM and ½ FEC are used.
- Uncorrelated exponentially decaying multipath channel.
- 64QAM for data OFDM symbols. Performance is measured on un-coded (without using FEC) bit error probability, also known as channel bit error probability.

FIG. 18 shows the computer simulation results. FIG. 18 also shows "perfect" results for comparison to the simulated results, wherein "perfect results" refer to:
1. Estimation of the channel is perfect without being deteriorated by receiver noise or signal processing error (such as interpolation error),
2. Feedback of the channel is perfect without being degraded by channel compression and/or quantisation, and
3. Calculation of the channel inverse is perfect without having interpolation error.

The combined use of the methods were found to produce the results close to those of the perfect channel estimation, feedback, and channel inverse calculation, approximately only 1 dB away as shown by FIG. 18.

It will be appreciated that the uplink and downlink signal processing methods can be performed by the access point 110 and the user terminals 120. In particular, during uplink signal processing, the access point 110 is configured to:
1. estimate, based on an uplink channel training OFDM symbol from each user terminal 120, uplink channel coefficients of pilot sub-carriers, the pilot sub-carriers 200 including locally consecutive pilot sub-carriers 300;
2. estimate an uplink phase slope by using the uplink channel coefficients at the locally consecutive pilot sub-carriers 300;
3. remove the uplink phase slope from the uplink estimated channel coefficients at the pilot sub-carriers 200 to obtain phase slope removed uplink estimated channel coefficients;
4. determine phase slope removed uplink estimated channel coefficients of one or more remaining sub-carriers by interpolation using the phase slope removed channel coefficients at the pilot sub-carriers;
5. interpolate, using the phase slope removed uplink estimated channel coefficients at the pilot sub-carriers and the one or more remaining sub-carriers, phase slope removed uplink channel coefficients at channel inverse sub-carriers 1400;
6. perform channel inversion using the phase slope removed uplink estimated channel coefficients at the channel inverse sub-carriers 1400 to obtain an initial portion of elements of an uplink channel inverse;
7. interpolate a remaining portion of elements of the uplink channel inverse using the initial portion of elements of the uplink channel inverse; and
8. perform zero-forcing detection upon OFDM data symbols received from each user terminal 120 using the respective uplink channel inverse, wherein the phase slope is applied to reconstructed transmitted symbols.

During downlink signal processing, each user terminal 120 is configured to:

1. estimate, using downlink channel training OFDM symbols received from the access point 110, downlink estimated channel coefficients of the pilot sub-carriers 200;
2. estimate a downlink phase slope by using the estimated channel coefficients at the locally consecutive pilot sub-carriers 300;
3. remove the downlink phase slope from the estimated channel coefficients at the pilot sub-carriers 200 to obtain phase slope removed downlink estimated channel coefficients at the pilot sub-carriers; and
4. determine phase slope removed channel coefficients of one or more remaining sub-carriers by interpolation using the phase slope removed estimated channel coefficients at the pilot sub-carriers;
5. perform a discrete cosine transform (DCT) of the phase slope removed downlink estimated channel coefficients at the pilot sub-carriers to obtain DCT downlink channel coefficients;
6. quantise the DCT downlink channel coefficients to obtain quantised DCT downlink channel coefficients; and
7. transfer to the access point 110, the quantised DCT downlink channel coefficients.

Also, during the downlink signal processing for each user terminal 120, the access point 110 is configured to:

1. receive, from each user terminal 120, the quantised DCT downlink channel coefficients;
2. perform an inverse discrete cosine transform (IDCT) of the quantised DCT downlink channel coefficients to obtain the phase slope removed downlink estimated channel coefficients at the pilot sub-carriers in the frequency domain;
3. interpolate, using the phase slope removed downlink estimated channel coefficients at the pilot sub-carriers, phase slope removed downlink estimated channel coefficients at the channel inverse sub-carriers;
4. perform channel inversion using the phase slope removed downlink estimated channel coefficients at the channel inverse sub-carriers to obtain an initial portion of elements of a downlink channel inverse for the respective user terminal;
5. interpolate a remaining portion of elements of the downlink channel inverse using the initial portion of elements of the downlink channel inverse;
6. transmit, to each user terminal 120, a downlink OFDM training symbol pre-coded with the respective downlink channel inverse to allow the respective user terminal to determine an estimated pre-coded channel; and
7. transmit, to the each user terminal 120, OFDM data symbols pre-coded with the respective downlink channel inverse to allow the respective user terminal to perform zero-forcing detection using the estimated pre-coded channel.

Figure 19A:
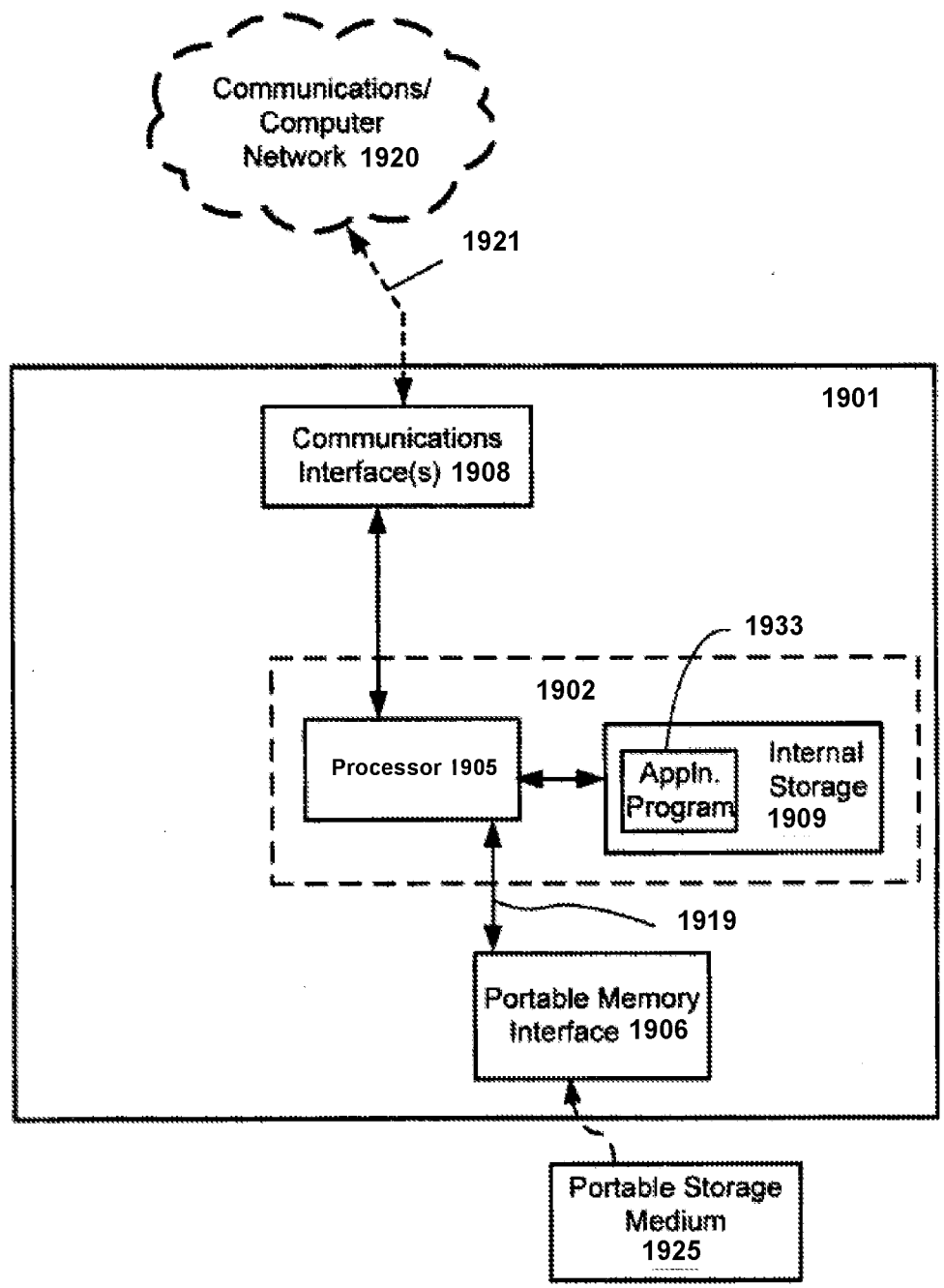
FIGS. 19A and 19B collectively form a schematic block diagram representation of an example embedded electronic device which can be used as the access point and/or the user device.
Figure 19B:
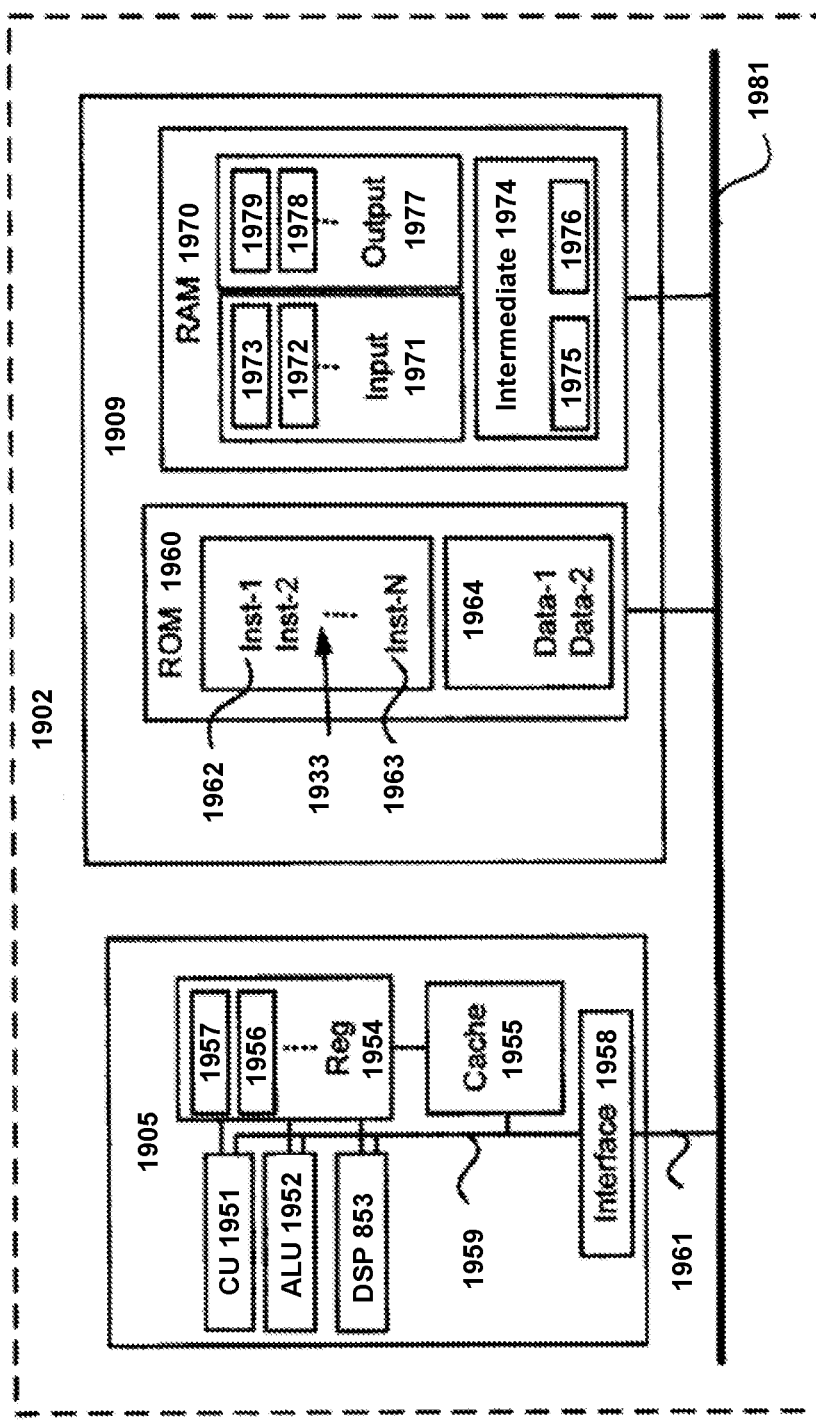

FIGS. 19A and 19B collectively form a schematic block diagram of a general purpose electronic device 1901 including embedded components which are suitable for use as part of the access point 110 and/or the user terminal 120 which can both act as a receiving device 105. In particular embodiments, the electronic device 801 may be implemented in dedicated hardware such as one or more integrated circuits performing the above-mentioned functions. Such dedicated hardware may include graphic processors, digital signal processors, or one or more microprocessors and associated memories.

As seen in FIG. 19A, the electronic device 1901 comprises an embedded controller 1902. Accordingly, the electronic device 1901 may be referred to as an "embedded device." In the present example, the controller 1902 has a processing unit (or processor) 1905 which is bi-directionally coupled to an internal storage module 1909. The storage module 1909 may be formed from non-volatile semiconductor read only memory (ROM) 1960 and semiconductor random access memory (RAM) 1970, as seen in FIG. 19B. The RAM 1970 may be volatile, non-volatile or a combination of volatile and non-volatile memory.

As seen in FIG. 19A, the electronic device 1901 also comprises a portable memory interface 1906, which is coupled to the processor 1905 via a connection 1919. The portable memory interface 1906 allows a complementary portable memory device 1925 to be coupled to the electronic device 1901 to act as a source or destination of data or to supplement the internal storage module 1909. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1901 also has a communications interface 1908 to permit coupling of the electronic device 1901 to a computer or communications network 1920 via a connection 1921. The connection 1921 may be wired or wireless. For example, the connection 1921 may be radio frequency or optical. An example of a wired connection includes Ethernet. Further, an example of wireless connection includes Bluetooth type local interconnection, Wi-Fi (including protocols based on the standards of the IEEE 802.11 family), Infrared Data Association (IrDa) and the like.

The methods of FIGS. 4, 6, 7, 12, 13, 15 and/or 17 may be implemented as one or more software application programs 833 executable within the embedded controller 802 or a plurality of embedded controllers 802 in a distributed manner. In particular, with reference to FIG. 19B, the steps of the described method are effected by instructions in the software 1933 that are carried out within the embedded controller 1902. The software instructions may be formed as one or more code modules, each for performing one or more particular tasks.

The software 1933 of the embedded controller 1902 is typically stored in the nonvolatile ROM 1960 of the internal storage module 1909. The software 1933 stored in the ROM 1960 can be updated when required from a computer readable medium. The software 1933 can be loaded into and executed by the processor 1905. In some instances, the processor 1905 may execute software instructions that are located in RAM 1970. Software instructions may be loaded into the RAM 1970 by the processor 1905 initiating a copy of one or more code modules from ROM 1960 into RAM 1970. Alternatively, the software instructions of one or more code modules may be pre-installed in a non-volatile region of RAM 1970 by a manufacturer. After one or more code modules have been located in RAM 1970, the processor 1905 may execute software instructions of the one or more code modules.

The application program 1933 is typically pre-installed and stored in the ROM 1960 by a manufacturer, prior to distribution of the electronic device 1901. However, in some instances, the application programs 1933 may be supplied to the user encoded on one or more computer readable storage media 1925 and read via the portable memory interface 1906 of FIG. 19A prior to storage in the internal storage module 1909. In another alternative, the software application program 1933 may be read by the processor 1905 from the network 1920. Computer readable storage media refers to any non-transitory, tangible storage medium that participates in providing instructions and/or data to the embedded controller 1902 for execution and or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the electronic device 1901. Examples of computer readable transmission media that may also participate in the provision of software, application programs, instructions and/or data to the electronic device 1901 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 19B illustrates in detail the embedded controller 1902 having the processor 1905 for executing the application programs 1933 and the internal storage 1909. The internal storage 1909 comprises read only memory (ROM) 1960 and random access memory (RAM) 1970. The processor 1905 is able to execute the application programs 1933 stored in one or both of the connected memories 1960 and 1970. When the electronic device 1901 is initially powered up, a system program resident in the ROM 860 is executed. The application program 1933 permanently stored in the ROM 1960 is sometimes referred to as "firmware". Execution of the firmware by the processor 1905 may fulfil various functions, including processor management, memory management, device management, storage management and user interface.

The processor 1905 typically includes a number of functional modules including a control unit (CU) 1951, an arithmetic logic unit (ALU) 1952 and a local or internal memory comprising a set of registers 1954 which typically contain atomic data elements 1956, 1957, along with internal buffer or cache memory 1955. One or more internal buses 1959 interconnect these functional modules. The processor 1905 typically also has one or more interfaces 1958 for communicating with external devices via system bus 1981, using a connection 1961.

The application program 1933 includes a sequence of instructions 1962 through to 1963 that may include conditional branch and loop instructions. The program 1933 may also include data, which is used in execution of the program 1933. This data may be stored as part of the instruction or in a separate location 1964 within the ROM 1960 or RAM 1970.

In general, the processor 1905 is given a set of instructions, which are executed therein. This set of instructions may be organised into blocks, which perform specific tasks or handle specific events that occur in the electronic device 1901. Typically, the application program 1933 waits for events and subsequently executes the block of code associated with that event. Events may be triggered in response to input from a user, via the user input devices 1913 of FIG. 19A, as detected by the processor 1905. Events may also be triggered in response to other sensors and interfaces in the electronic device 1901.

The execution of a set of the instructions may require numeric variables to be read and modified. Such numeric variables are stored in the RAM 1970. The disclosed method uses input variables 1971 that are stored in known locations 1972, 1973 in the memory 1970. The input variables 1971 are processed to produce output variables 1977 that are stored in known locations 1978, 1979 in the memory 1970. Intermediate variables 1974 may be stored in additional memory locations in locations 1975, 1976 of the memory 1970. Alternatively, some intermediate variables may only exist in the registers 1954 of the processor 1905.

The execution of a sequence of instructions is achieved in the processor 1905 by repeated application of a fetch-execute cycle. The control unit 1951 of the processor 1905 maintains a register called the program counter, which contains the address in ROM 1960 or RAM 1970 of the next instruction to be executed. At the start of the fetch execute cycle, the contents of the memory address indexed by the program counter is loaded into the control unit 1951. The instruction thus loaded controls the subsequent operation of the processor 1905, causing for example, data to be loaded from ROM memory 1960 into processor registers 1954, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the method of FIGS. 4, 6, 7, 12, 13, 15 and/or 17 is associated with one or more segments of the application program 833, and is performed by repeated execution of a fetch-execute cycle in the processor 805 or similar programmatic operation of other independent processor blocks in the electronic device 801.

It will be appreciated from above that each user terminal 120 includes an antenna coupled to or integrated with the embedded controller 1902. It will also be appreciated that the access point 110 includes multiple antennas 112 which are coupled to or integrated with the embedded controller 1902.

The arrangements describes are applicable to the wireless communication industries.

Many modifications will be apparent to those skilled in the art without departing from the scope of the present invention.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

The invention claimed is:

1. A method including:
    estimating, by a receiving device, channel coefficients of pilot sub-carriers for a multi-user multiple-input multiple-output orthogonal frequency division multiplexing (MU-MIMO OFDM) system, the pilot sub-carriers including locally consecutive pilot sub-carriers;
    estimating, by the receiving device, a phase slope by using the channel coefficients at the locally consecutive pilot sub-carriers;

removing, by the receiving device, the phase slope from the estimated channel coefficients at the pilot sub-carriers to obtain phase slope removed estimated channel coefficients; and determining, by the receiving device, phase slope removed estimated channel coefficients of one or more remaining sub-carriers by interpolation using the phase slope removed estimated channel coefficients;

wherein the locally consecutive pilot sub-carriers are formed by shifting at least one original pilot.

2. The method according to claim 1, wherein at least one of:

the receiving device is able to estimate the phase slope without ambiguity up to N/2, where N is a number of baseband samples per OFDM frame for the MU-MIMO OFDM system;

the phase slope is calculated according to;

$$\theta_E = \frac{(H_E(i_S + i_T + 1)H_E^*(i_S + i_T))}{\sum_{i_T=1}^{N_T} |H_E(i_S + i_T + 1)||H_E(i_S + i_T)|} \sum_{i_T=1}^{N_T} |H_E(i_S + i_T + 1)||H_E(i_S + i_T)|\angle$$

removing the phase slope from the estimated channel coefficients at the pilot sub-carriers is performed according to;

$G_E(1+(i_P-1)F)=H_E(1+(i_P-1)F)\exp(-j\theta_E[1+(i_P-1)F])$;
and, interpolating the phase slope removed estimated channel coefficients at the one or more sub-carriers includes linear interpolation performed according to $G_E(i_F) =$ $\frac{i_F - 1 - (i_P - 1)F}{F} G_E(1 + i_P F) + \frac{1 - i_F + 1 + (i_P - 1)F}{F} G_E(1 + (i_P - 1)F)$, where $1+(i_P-1)F \leq i_F < 1+i_P F$.

3. The method according to claim 1, wherein the method includes applying the phase slope to the phase slope removed estimated channel coefficients at the one or more remaining sub-carriers according to $H_E(i_F)=G_E(i_F)\exp(j\theta_E i_F)$.

4. The method according to claim 1, wherein the method includes:

performing, by a user terminal, a discrete cosine transform (DCT) of the phase slope removed estimated channel coefficients at the pilot sub-carriers and the one or more remaining sub-carriers to obtain DCT channel coefficients;

quantising, by the user terminal, the DCT channel coefficients to obtain quantised DCT channel coefficients;

transferring, from the user terminal to an access point, the quantised DCT channel coefficients; and performing, by the access point, an inverse discrete cosine transform (IDCT) of the quantised DCT channel coefficients to obtain the phase slope removed estimated channel coefficients at the pilot sub-carriers and the one or more remaining sub-carriers in the frequency domain.

5. The method according to claim 4, wherein at least one of:

the DCT channel coefficients include real DCT channel coefficients determined according to $$d_{E,Re}(i_D) = w(i_D) \sum_{i_F=1}^{N_F} Re(H_E(i_F)) \cos\left(\frac{\pi(2i_F - 1)(i_D - 1)}{2N_D}\right)$$

and imaginary DCT channel coefficients determined according to $$d_{E,Im}(i_D) = w(i_D) \sum_{i_F=1}^{N_F} Im(H(i_F)) \cos\left(\frac{\pi(2i_F - 1)(i_D - 1)}{2N_D}\right)$$

where $$w(i_D) = \begin{cases} \frac{1}{\sqrt{N_D}}, & i_D = 1 \\ \sqrt{\frac{2}{N_D}}, & 2 \leq i_D \leq N_D \end{cases}$$

and where $i_D$ is the DCT coefficient index; and ND is the total number of DCT coefficients;

bit allocation for quantising the DCT channel coefficients to obtain the quantised DCT channel coefficients is based on maximum channel coefficient amplitudes for each of the DCT channel coefficients used; and, performing the IDCT of the quantised DCT channel coefficients includes performing the IDCT upon a quantized real part of the quantised DCT channel coefficients according to $$H_{R,Re}(i_F) = \sum_{i_D=1}^{N_D} w(i_D) d_{E,Re,Q}(i_D) \cos\left(\frac{\pi(2i_F - 1)(i_D - 1)}{2N_D}\right)$$

and performing the IDCT upon a quantized imaginary part of the quantised DCT channel coefficients according to $$H_{R,Im}(i_F) = \sum_{i_D=1}^{N_D} w(i_D) d_{E,Im,Q}(i_D) \cos\left(\frac{\pi(2i_F - 1)(i_D - 1)}{2N_D}\right)$$

such that the phase slope removed estimated channel coefficients at the pilot sub-carriers and the one or more remaining sub-carriers are restored in the frequency domain according to $H_R(i_F)=H_{R,Re}(i_F)+jH_{R,Im}(i_F)$.

6. The method according to claim 1, wherein the method includes performing uplink signal processing including:

interpolating, by an access point, using the phase slope removed estimated channel coefficients at the pilot sub-carriers, phase slope removed channel coefficients at channel inverse sub-carriers;

performing, by the access point, channel inversion using the phase slope removed channel coefficients at the channel inverse sub-carriers to obtain an initial portion of elements of a channel inverse;

interpolating, by the access point, a remaining portion of elements of the channel inverse using the initial portion of elements; and performing, by the access point, zero-forcing detection upon OFDM data symbols received from a user terminal using the channel inverse, wherein the phase slope is applied to reconstructed transmitted symbols.

7. The method according to claim 1, wherein the method includes performing downlink signal processing including:
receiving, at an access point from the user terminal, the phase slope removed estimated channel coefficients at the pilot sub-carriers and the one or more remaining sub-carriers;
interpolating, by the access point using the phase slope removed estimated channel coefficients at the pilot sub-carriers and the one or more remaining sub-carriers, phase slope removed estimated channel coefficients at channel inverse sub-carriers;
performing, at the access point, channel inversion using the phase slope removed estimated channel coefficients at channel inverse sub-carriers to obtain an initial portion of elements of a channel inverse; and
interpolating, by the access point, a remaining portion of elements of the channel inverse using the initial portion of elements;
transmitting, from the access point to the user terminal, an OFDM training symbol pre-coded with the channel inverse to allow the user terminal to determine an estimated pre-coded channel; and
transmitting, from the access point to the user terminal, OFDM data symbols pre-coded with the channel inverse such that the user terminal is able to perform zero-forcing detection using the estimated pre-coded channel.

8. The method according to claim 1, wherein the method includes performing downlink signal processing including:
performing, by the user terminal, a discrete cosine transform (DCT) of the phase slope removed estimated channel coefficients at the pilot sub-carriers and the one or more remaining sub-carriers to obtain DCT channel coefficients;
quantising, by the user terminal, the DCT channel coefficients to obtain quantised DCT channel coefficients;
transferring, from the user terminal to an access point, the quantised DCT channel coefficients; and
performing, by the access point, an inverse discrete cosine transform (IDCT) of the quantised DCT channel coefficients to obtain the phase slope removed estimated channel coefficients at the pilot sub-carriers and the one or more remaining sub-carriers in the frequency domain;
interpolating, by the access point using the phase slope removed estimated channel coefficients at the pilot subcarriers and the one or more remaining sub-carriers, phase slope removed estimated channel coefficients at channel inverse sub-carriers;
performing, at the access point, channel inversion using the phase slope removed estimated channel coefficients at channel inverse sub-carriers to obtain an initial portion of elements of a channel inverse;
interpolating, by the access point, a remaining portion of elements of the channel inverse using the initial portion of elements;
transmitting, from the access point to the user terminal, an OFDM training symbol pre-coded with the channel inverse to allow the user terminal to determine an estimated pre-coded channel; and
transmitting, from the access point to the user terminal, OFDM data symbols pre-coded with the channel inverse to allow the user terminal to perform zero-forcing detection using the estimated pre-coded channel.

9. A receiving device configured to:
estimate channel coefficients of pilot sub-carriers for a multi-user multiple-input multiple-output orthogonal frequency division multiplexing (MU-MIMO OFDM) system, the pilot sub-carriers including locally consecutive pilot sub-carriers;
estimate a phase slope by using the channel coefficients at the locally consecutive pilot sub-carriers;
remove the phase slope from the estimated channel coefficients at the pilot sub-carriers to obtain phase slope removed estimated channel coefficients; and
determine phase slope removed estimated channel coefficients of one or more remaining sub-carriers by interpolation using the phase slope removed estimated channel coefficients;
wherein the locally consecutive pilot sub-carriers are formed by shifting at least one original pilot sub-carrier.

10. A method of performing channel feedback compression in a multi-user multiple-input multiple-output orthogonal frequency division multiplexing (MU-MIMO OFDM) system, wherein the method includes:
performing, by a user terminal, a discrete cosine transform (DCT) of a plurality of estimated channel coefficients to obtain DCT channel coefficients;
quantizing, by the user terminal, the DCT channel coefficients to obtain quantised DCT channel coefficients;
transferring, from the user terminal to an access point, the quantised DCT channel coefficients;
performing, by the access point, an inverse discrete cosine transform (IDCT) of the quantised DCT channel coefficients to obtain the plurality of channel coefficients in the frequency domain.

11. A multi-user multiple-input multiple-output orthogonal frequency division multiplexing (MU-MIMO OFDM) system configured to perform channel feedback compression, wherein the system includes:
a plurality of user terminals, wherein each user terminal is configured to:
perform a discrete cosine transform (DCT) of a plurality of estimated channel coefficients to obtain DCT channel coefficients;
quantize the DCT channel coefficients to obtain quantised DCT channel coefficients;
transfer to an access point, the quantised DCT channel coefficients;
the access point configured to:
receive the quantised DCT channel coefficients from each user terminal;
perform, upon the quantised DCT channel coefficients received from each terminal, an inverse discrete cosine transform (IDCT) of the quantised DCT channel coefficients to obtain the plurality of estimated channel coefficients in the frequency domain for the respective user terminal.

12. A MU-MIMO OFDM system including a plurality of user terminals and an access point:
wherein during uplink signal processing, the access point is configured to:
estimate, based on a uplink channel training OFDM symbol from each user terminal, uplink estimated channel coefficients of pilot sub-carriers, the pilot sub-carriers including locally consecutive pilot sub-carriers;

estimate an uplink phase slope by using the uplink estimated channel coefficients at the locally consecutive pilot sub-carriers;

remove the uplink phase slope from the uplink estimated channel coefficients at the pilot sub-carriers to obtain phase slope removed uplink estimated channel coefficients;

determine phase slope removed uplink estimated channel coefficients of one or more remaining sub-carriers by interpolation using the phase slope removed uplink estimated channel coefficients at the pilot sub-carriers;

interpolate, using the phase slope removed uplink estimated channel coefficients at the pilot sub-carriers and the one or more remaining sub-carriers, phase slope removed uplink estimated channel coefficients at channel inverse sub-carriers;

perform channel inversion using the phase slope removed uplink channel coefficients at the channel inverse sub-carriers to obtain an initial portion of elements of an uplink channel inverse;

interpolate a remaining portion of elements of the uplink channel inverse using the initial portion of elements of the uplink channel inverse; and perform zero-forcing detection upon OFDM data symbols received from each user terminal using the respective uplink channel inverse, wherein the phase slope is applied to reconstructed transmitted symbols;

wherein during downlink signal processing, each user terminal is configured to:

estimate, using downlink channel training OFDM symbols received from the access point, downlink estimated channel coefficients of the pilot sub-carriers;

estimate a downlink phase slope by using the downlink estimated channel coefficients at the locally consecutive pilot sub-carriers;

remove the downlink phase slope from the downlink estimated channel coefficients at the pilot sub-carriers to obtain phase slope removed downlink estimated channel coefficients at the pilot sub-carriers; and determine phase slope removed downlink estimated channel coefficients of one or more remaining sub-carriers by interpolation using the phase slope removed channel coefficients at the pilot sub-carriers;

perform a discrete cosine transform (DCT) of the phase slope removed downlink estimated channel coefficients at the pilot sub-carriers to obtain DCT downlink channel coefficients;

quantise the DCT downlink channel coefficients to obtain quantised DCT downlink channel coefficients; and transfer to the access point, the quantised DCT downlink channel coefficients; and wherein during the downlink signal processing for each user terminal, the access point is configured to:

receive, from each user terminal, the quantised DCT downlink channel coefficients;

perform an inverse discrete cosine transform (IDCT) of the quantised DCT downlink channel coefficients to obtain the phase slope removed downlink estimated channel coefficients at the pilot sub-carriers in the frequency domain;

interpolate, using the phase slope removed downlink estimated channel coefficients at the pilot sub-carriers, phase slope removed downlink estimated channel coefficients at the channel inverse sub-carriers;

perform channel inversion using the phase slope removed downlink estimated channel coefficients at the channel inverse sub-carriers to obtain an initial portion of elements of a downlink channel inverse for the respective user terminal;

interpolate a remaining portion of elements of the downlink channel inverse using the initial portion of elements of the downlink channel inverse;

transmit, to each user terminal, a downlink OFDM training symbol pre-coded with the respective downlink channel inverse to allow each respective user terminal to determine an estimated pre-coded channel; and transmit, to each user terminal, OFDM data symbols pre-coded with the respective downlink channel inverse to allow each respective user terminal to perform zero-forcing detection using the estimated pre-coded channel.

13. A method including:

estimating, by a receiving device, channel coefficients of locally consecutive pilot sub-carriers for a multi-user multiple-input multiple-output orthogonal frequency division multiplexing (MU-MIMO OFDM) system;

estimating, by the receiving device, a phase slope by using the estimated channel coefficients at the locally consecutive pilot sub-carriers;

removing, by the receiving device, the phase slope from the estimated channel coefficients at the locally consecutive pilot sub-carriers to obtain phase slope removed channel coefficients;

determining, by the receiving device, phase slope removed channel coefficients of remaining sub-carriers by interpolating the phase slope removed channel coefficients; and applying, by the receiving device, the phase slope to the phase slope removed channel coefficients at the locally consecutive pilot sub-carriers and the remaining sub-carriers to obtain a plurality of channel coefficients;

wherein the locally consecutive pilot sub-carriers are formed by shifting at least one original pilot sub-carrier.

14. The method according to claim 13, wherein at least one of:

the receiving device is able to estimate the phase slope without ambiguity up to N/2, where N is a number of base band samples per OFDM frame for the MU-MIMO OFDM system;

the phase slope is calculated according to $$\theta_E = \frac{\sum_{i_T=1}^{N_T} |H_E(i_S + i_T + 1)||H_E(i_S + i_T)|\angle(H_E(i_S + i_T + 1)H_E^*(i_S + i_T))}{\sum_{i_T=1}^{N_T} |H_E(i_S + i_T + 1)||H_E(i_S + i_T)|};$$

removing the phase slope from the estimated channel coefficients at the pilot sub-carriers is performed according to $G_E(1+(i_P-1)F)=H_E(1+(i_P-1)F)\exp(-j\theta_E[1+(i_P-1)F]);$
and, interpolating the phase slope removed estimated channel coefficients at the one or more sub-carriers includes linear interpolation performed according to $$G_E(i_F) = \frac{i_F - 1 - (i_P - 1)F}{F} G_E(1 + i_P F) + \frac{1 - i_F + 1 + (i_P - 1)F}{F} G_E(1 + (i_P - 1)F),$$

where $1+(i_P-1)F \le i_F < 1+i_P F$.

15. The method according to claim 13, wherein applying the phase slope to the plurality of channel coefficients at the locally consecutive pilot sub-carriers and the remaining sub-carriers is performed according to $H_E(i_F)=G_E(i_F)\exp(j\theta_E i_F)$.

16. The method according to claim 13, wherein the method includes:
   performing, by a user terminal, a discrete cosine transform (DCT) of the plurality of channel coefficients to obtain DCT channel coefficients;
   quantising, by the user terminal, the DCT channel coefficients to obtain quantised DCT channel coefficients;
   transferring, from the user terminal to an access point, the quantised DCT channel coefficients; and
   performing, by the access point, an inverse discrete cosine transform (IDCT) of the quantised DCT channel coefficients to obtain the plurality of channel coefficients in the frequency domain.

17. The method according to claim 16, wherein at least one of:
   the DCT channel coefficients include real DCT channel coefficients determined according to Equation 9 and imaginary DCT channel coefficients determined according to $$d_{E,Im}(i_D) = w(i_D) \sum_{i_F=1}^{N_F} \text{Im}(H(i_F)) \cos\left(\frac{\pi(2i_F - 1)(i_D - 1)}{2N_D}\right)$$

where $$w(i_D) = \begin{cases} \frac{1}{\sqrt{N_D}}, & i_D = 1 \\ \sqrt{\frac{2}{N_D}}, & 2 \le i_D \le N_D \end{cases}$$

and where $i_D$ is the DCT coefficient index; and $N_D$ is the total number of DCT coefficients;
   quantising the DCT channel coefficients to obtain quantised DCT channel coefficients is performed by uniform scalar quantization on the real and imaginary parts of the DCT channel coefficients; and,
   performing the IDCT of the quantised DCT channel coefficients includes performing the IDCT upon the quantized real part of the DCT channel coefficients according to $$H_{R,Re}(i_F) = \sum_{i_D=1}^{N_D} w(i_D) d_{E,Re,Q}(i_D) \cos\left(\frac{\pi(2i_F - 1)(i_D - 1)}{2N_D}\right)$$

and performing the IDCT upon the quantized imaginary part of the DCT channel coefficients according to $$H_{R,Im}(i_F) = \sum_{i_D=1}^{N_D} w(i_D) d_{E,Im,Q}(i_D) \cos\left(\frac{\pi(2i_F - 1)(i_D - 1)}{2N_D}\right)$$

such that the plurality of channel coefficients in the frequency domain is restored according to $H_R(i_F)=H_{R,Re}(i_F)+jH_{R,Im}(i_F)$.

18. The method according to claim 13, wherein the method includes:
   determining, using a OFDM training symbol received from a user terminal, wherein the plurality of channel coefficients are uplink channel coefficients for the user terminal to obtain estimated uplink channel coefficients at channel inverse sub-carrier;
   performing channel inversion at the channel inverse sub-carrier; and
   performing interpolation of channel inverse by directly interpolating elements thereof;
   wherein OFDM data symbols received from the user terminal are reconstructable by an access point using the interpolated channel inverse.

19. The method according to claim 13, wherein the method includes:
   receiving, at an access point from a user terminal, the plurality of coefficients, wherein the plurality of coefficients are estimated downlink channel coefficients;
   obtaining, at the access point, estimated downlink channel coefficients at channel inverse sub-carrier;
   performing, at the access point, channel inversion at channel inverse sub-carrier; and
   performing interpolation of channel inverse by directly interpolating elements thereof;
   wherein OFDM data symbols transmitted to the user terminal are precoded with the channel inverse such that the user terminal can reconstruct the OFDM data symbols.

20. A receiving device configured to:
   estimate channel coefficients of locally consecutive pilot sub-carriers for a multi-user multiple-input multiple-output orthogonal frequency division multiplexing (MU-MIMO OFDM) system;
   estimate a phase slope by using the estimated channel coefficients at the locally consecutive pilot sub-carriers;
   remove the phase slope from the estimated channel coefficients at the locally consecutive pilot sub-carriers to obtain phase slope removed channel coefficients;
   determine phase slope removed channel coefficients of remaining sub-carriers by interpolating the phase slope removed channel coefficients; and
   apply the phase slope to the phase slope removed channel coefficients at the locally consecutive pilot sub-carriers and the remaining sub-carriers to obtain a plurality of channel coefficients,
   wherein the locally consecutive pilot sub-carriers are formed by shifting at least one original pilot sub-carriers.

21. A method of performing channel feedback compression in a multi-user multiple-input multiple-output orthogonal frequency division multiplexing (MU-MIMO OFDM) system, wherein the method includes:
   performing, by a user terminal, a discrete cosine transform (DCT) of a plurality of channel coefficients to obtain DCT channel coefficients;
   quantizing, by the user terminal, the DCT channel coefficients to obtain quantised DCT channel coefficients;

transferring, from the user terminal to an access point, the quantised DCT channel coefficients;

performing, by the access point, an inverse discrete cosine transform (IDCT) of the quantised DCT channel coefficients to obtain the plurality of channel coefficients in the frequency domain.

22. A multi-user multiple-input multiple-output orthogonal frequency division multiplexing (MU-MIMO OFDM) system configured to perform channel feedback compression, wherein the system includes:

a plurality of user terminals, wherein each user terminal is configured to:

perform a discrete cosine transform (DCT) of a plurality of channel coefficients to obtain DCT channel coefficients;

quantize the DCT channel coefficients to obtain quantised DCT channel coefficients;

transfer to an access point, the quantised DCT channel coefficients;

the access point configured to:

receive the quantised DCT channel coefficients from each user terminal;

perform, upon the quantised DCT channel coefficients received from each terminal, an inverse discrete cosine transform (IDCT) of the quantised DCT channel coefficients to obtain the plurality of channel coefficients in the frequency domain for the respective user terminal.

* * * * *